(12) United States Patent
Sakai et al.

(10) Patent No.: US 7,215,842 B2
(45) Date of Patent: May 8, 2007

(54) LIGHT CONTROL ELEMENT AND LIGHT CONTROL DEVICE

(75) Inventors: Atsushi Sakai, Kanagawa (JP); Ikuo Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 43 days.

(21) Appl. No.: 10/825,373

(22) Filed: Apr. 16, 2004

(65) Prior Publication Data
US 2005/0002605 A1    Jan. 6, 2005

(30) Foreign Application Priority Data
Apr. 18, 2003  (JP) .............................. 2003-113591

(51) Int. Cl.
*G02B 6/26* (2006.01)
(52) U.S. Cl. .......................... 385/16; 385/15
(58) Field of Classification Search .................. 385/15, 385/16
See application file for complete search history.

(56) References Cited

U.S. PATENT DOCUMENTS

| | | | |
|---|---|---|---|
| 5,719,981 A | 2/1998 | Katoh et al. | |
| 6,514,328 B1 | 2/2003 | Katoh et al. | |
| 6,822,784 B2 * | 11/2004 | Fukshima et al. | 359/298 |
| 6,937,781 B2 * | 8/2005 | Shirane et al. | 385/16 |
| 7,110,630 B2 * | 9/2006 | Suzuki | 385/14 |
| 2003/0098945 A1 | 5/2003 | Sugimoto et al. | |
| 2004/0175174 A1 * | 9/2004 | Suhami | 398/43 |

FOREIGN PATENT DOCUMENTS

| | | |
|---|---|---|
| JP | 2002-122798 | 4/2002 |
| JP | 2002-221680 | 8/2002 |
| JP | 2002-303836 | 10/2002 |

OTHER PUBLICATIONS

H. Kosaka, et al., Physical Review B, vol. 58, No. 16, pp. R10 096-R10 099, "Superprism Phenomena in Photonic Crystals", Oct. 15, 1998.
C. Manolatou, et al., Journal of Lightwave Technology, vol. 17, No. 9, pp. 1682-1692, "High-Density Integrated Optics", Sep. 1999.

* cited by examiner

*Primary Examiner*—Jennifer Doan
(74) *Attorney, Agent, or Firm*—Oblon, Spivak, McClelland, Maier & Neustadt, P.C.

(57) ABSTRACT

A light control element includes a substrate, an optical coupling component formed on the substrate by a photonic crystal structure, and a variable refractive index part provided in a part of the photonic crystal structure so as to divide The optical coupling component into two regions, wherein a traveling direction of a light is changed at an interface of the regions by changing a refractive index at the variable refractive index part such that there is caused a reflection for at least one wavenumber of the light.

14 Claims, 18 Drawing Sheets

LIGHT CONTROL ELEMENT AND LIGHT CONTROL DEVICE

BACKGROUND OF THE INVENTION

The present invention is related to light control elements and light control devices using a photonic crystal structure and applicable to light switches, optical intensity modulators, and the like.

A photonic crystal forms a photonic bandgap, which is a forbidden band of photons, as a result of dielectric periodical structure having a period corresponding to optical wavelength and exhibits singular effects due to its strong dispersion. Thus, photonic crystals are expected as an ultra minute optical integrated circuits or novel functional optical devices. By using these properties, it becomes possible to construct light control elements such as light switches or optical intensity modulators having an extremely minute optical path modification function.

Various structures are proposed for optical path switching devices according to the applications and according to the materials used therefor. For example, Japanese Laid-Open Patent Application 2002-221680 describes optical path switching by moving an optical path changing fluid with respect to an operation fluid having a matched refractive index, such that the optical path changing fluid has a refractive index different from the refractive index of the foregoing operation fluid.

Further, Japanese Laid-Open Patent Application 2002-122798 describes optical path switching achieved by moving a galvanometric mirror inserted between optical waveguides in the state that the mirror is sandwiched by electromagnets.

Further, in the field of optical telecommunication in trunk systems, a system using a reflector called MEMS (Micro Electro-mechanical system) is used.

In these conventional methods, there exists an advantage of achieving large extinction ratio with simple construction, while such a conventional construction has a drawback, associated with its construction of using mechanical movement of an object such as thermal pressure generator or electromagnet, that it is difficult to achieve high-speed switching.

As a high-speed optical switch, a device based on directional coupler formed of lithium niobate or a device of Mach Zehnder type is used generally, wherein such high-speed optical switches are already in commercial production. However, such conventional high-speed optical switches have a drawback in that the device length of several centimeters. Because of the large device length, it is difficult to use such an optical switch for the optical interconnection switch on a circuit board carrying a semiconductor chip thereon.

Meanwhile, there is a proposal of an optical path switch using a photonic crystal. Particularly, there is a proposal of an optical switch that uses the strong dispersion of a photonic crystal called super prism effect (Physical Review B, vol. 58, p. 10096, 1998).

For example, Japanese Laid-Open Patent Application 2002-303836 describes an optical path switch that uses super prism effect.

FIG. 18 shows an example of the construction proposed in the Japanese Laid-Open Patent Application 2002-303863.

Referring to FIG. 18, an optical beam incident to a photonic crystal 202 via an optical waveguide 201 obliquely with respect to an optical axis thereof travels in the direction of an arrow shown in continuous line due to the dispersion of the photonic crystal in the state no current injection is made. Thereby, the incident optical beam exits to an optical waveguide 203 of channel 1 (CH1).

When a current injection is made, on the other hand, the refractive index of the medium constituting the photonic crystal 202 is changed, and resultant change of the refractive angle results in a change of propagating direction in the photonic crystal as represented by the arrow shown in a broken line. Thereby, the incident optical beam is directed to an optical waveguide 204 of channel 2 (CH2). Thus, the optical path switch of FIG. 18 induces a large change of deflection angle in the incident optical beam by the super prism effect for switching the incident optical beam to the exit optical waveguide 204.

Meanwhile, there is a problem in such an optical switch element that uses a photonic crystal in that the super prism effect is extremely sensitive to the incident angle and wavelength of the incident optical beam and that there occurs a large change of deflection angle when there is caused a very small change of wavelength in-the incident optical beam. Further, there is a need of fixing the incident angle of the incident optical beam with respect to the photonic crystal. Further, there exist various problems to be solved such as existence of strong reflection at the edge surface of the photonic crystal.

Further, there is a concept of integrating a photonic crystal with an interferometer of Mach-Zehnder type or directional coupler for achieving optical modulation or optical path switching. However, there has been no known construction capable of achieving such objects. Further, there have been no known devices that are used in practice.

SUMMARY OF THE INVENTION

Accordingly, it is a general object of the present invention to provide a novel and useful light control element and a light control device wherein the foregoing problems are eliminated.

Another and more specific object of the present invention is to provide a miniaturized light control element and a light control device capable of realizing various optical path switching by modulating a refractive index of a photonic crystal structure.

Another object of the present invention is to provide a miniaturized optical control element having a size comparable with a width of an optical waveguide and simultaneously operating at high speed with stability while maintaining large extinction ratio.

More specifically, the present invention provides a minute light control element having a size comparable with a width of an optical waveguide and yet capable of providing large extinction ratio and operating stably at high speed.

Further, the present invention provides a light control element in which the severe design tolerance imposed by the polarization characteristic of the photonic crystal is relaxed.

Further, the present invention provides a light control element formed by an extremely minute region and capable of capturing and release of photons is possible.

According to a first aspect of the present invention, there is provided a light control element comprising: a substrate; an optical coupling component formed on said substrate by a photonic crystal structure; and a variable refractive index part provided in a part of said photonic crystal structure so as to divide said optical coupling component into two regions, wherein a traveling direction of a light is changed at an interface of said regions by changing a refractive index at said variable refractive index part such that there is caused reflection for at least one wavenumber of said light.

Because the present invention does not use mechanical movement of object for changing the traveling direction of light, it becomes possible to construct a light control element such as optical path switch, and the like, having a large extinction ratio and operable at high speed with stability. Further, because of the use of reflection for changing the traveling direction of the light, the light control element such as an optical switch can be constructed without using a complex optical interference system or optical circuitry.

According to a second aspect of the present invention, there is provided a light control element comprising: a substrate; an optical waveguide formed on said substrate; an optical coupling component provided on said substrate by a photonic crystal structure, said optical waveguides being connected to said optical coupling component; and a variable refractive index part provided in a part of said photonic crystal structure, said variable refractive index part dividing said optical coupling component into at least two regions, wherein an interface between said regions changes a traveling direction of a light incident thereto by causing reflection in at least one wavenumber of said light in response to a change of refractive index in said variable refractive index part.

Thus, according to the second aspect of the present invention, it becomes possible to realize a path switching device of an optical signal with a minute area having a width comparable with that of an optical waveguide, in addition to the features noted with reference to the first aspect of the present invention. Further, because it becomes possible to reflect an optical beam having an oblique component by using the bandgap of a photonic crystal, the optical waveguide used in the present invention is not limited to a single mode optical waveguide but a multi mode optical waveguide can be used as well.

According to a third aspect of the present invention, there is provided a light control element comprising: a substrate; a plurality of optical waveguides formed on said substrate; an optical coupling component formed on said substrate, at least three of said optical waveguides being coupled to said optical coupling component; and a photonic crystal formed on at least one of said optical waveguides at an end part thereof coupled to said optical coupling component, said light control element changing a transmittance of light through said optical waveguide in a part corresponding to said photonic crystal structure in response to a change of refractive index of said photonic crystal structure.

By changing the transmittance of light in the optical waveguide corresponding to the photonic crystal structure by way of changing the refractive index of the photonic crystal structure, it becomes possible to realize a light control element having a large extinction ratio and capable of operating stably at high speed while miniaturizing the same to the size comparable to the width of the optical waveguide.

According to a fourth aspect of the present invention, there is provided a light control element comprising: a substrate; a plurality of optical waveguides formed on said substrate; an optical coupling component formed of a photonic crystal and provided on said substrate in a polygonal form, at least four of said optical waveguides being coupled to said optical coupling component; and a plurality of variable refractive index parts formed in said polygonal optical coupling component, said plurality of variable refractive index parts being formed in one or more regions of said polygonal optical coupling component divided from each other by a diagonal line, said plurality of variable refractive index parts changing a refractive index thereof independently, said light control element deflecting a traveling direction of light in said optical waveguide in response to a change of refractive index of said variable refractive index part.

By deflecting the traveling direction of the optical beam from the optical waveguide by changing the refractive index of the variable refractive index part formed in the photonic crystal structure, it becomes possible to provide a light control element having a large extinction ratio and operable stably at high speed while miniaturizing the same to the size comparable to the width of the optical waveguide.

According to a fifth aspect of the present invention, there is provided a light control element comprising: a substrate; a plurality of optical waveguides formed on said substrates; an optical coupling component formed of a photonic crystal and provided on said substrate in a polygonal form, at least four of said optical waveguides being connected to said optical coupling component; a photonic crystal formed on said optical waveguides at an end part thereof connected to said optical coupling component; and a plurality of variable refractive index parts formed of said photonic crystal and provided on said optical waveguide in correspondence to regions of said polygonal optical coupling component divided from each other by a diagonal line, said variable refractive index parts changing a refractive index thereof independently, said light control element deflecting a traveling direction of light from said optical waveguide in response to a change of refractive index of said variable refractive index part.

By deflecting a traveling direction of light from an optical waveguide by changing the refractive index of the variable refractive index part thus formed of the photonic crystal, it becomes possible to provide a light control element having a large extinction ratio and operable stably at high speed while miniaturizing the same to the size comparable to the width of the optical waveguide.

According to a sixth aspect of the present invention, there is provided a light control element comprising: a substrate; a plurality of optical waveguides formed on said substrate; and an optical coupling component formed of a photonic crystal and provided on said substrate in a polygonal form, at least four of said optical waveguides being coupled to said polygonal optical coupling component; and a plurality of variable refractive index parts formed in respective regions of said polygonal optical coupling components, said regions being divided from each other by a diagonal line of said polygonal optical coupling component, said variable refractive index parts changing a refractive index thereof independently, said light control element branching a light in said optical waveguide in response to a change of refractive indeed of said variable refractive index part.

By branching the light from the optical waveguide by changing the refractive index of the variable refractive index parts of the photonic crystal independently, it becomes possible to provide a light control element having a large extinction ratio and operable stably at high speed while miniaturizing the same to the size comparable to the width of the optical waveguide.

According to a seventh aspect of the present invention, there is provided a light control element comprising: a substrate; a plurality of optical waveguides formed on said substrate; an optical coupling component formed on said substrate and coupled with at least three of said optical waveguides; first and second photonic crystals formed on an optical waveguide coupled to said optical coupling component at an end part thereof coupled to said optical coupling component, said first photonic crystal including a structure for reflecting or transmitting a transverse electric mode wave, said second photonic crystal including a structure for reflecting or transmitting a transverse magnetic mode wave; and first and second variable refractive index parts provided respectively by said first and second photonic crystals, said first variable refractive index part and said second variable refractive index part respectively changing a transmittance of said transverse electric mode wave and a transmittance of said transverse magnetic mode wave independently from each other, said light control element separating a transverse electric mode wave and a transverse magnetic mode wave in response to a change of refractive index of said first and second variable refractive index parts.

Thus, by forming first and second photonic crystals on an optical waveguide as the first and second variable refractive index parts and by changing the refractive indices thereof independently, the transverse electric mode wave and the transverse magnetic wave in the light in the optical waveguide is separated. Thereby, polarization dependence of the light control element, caused by the polarization characteristics of the photonic crystal is successfully resolved, and the restriction imposed in the designing of an optical signal processing system by the polarization characteristics of the photonic crystals is reduced.

According to an eighth aspect of the present invention, there is provided a light control element, comprising: a substrate; a plurality of optical waveguides formed on said substrate; an optical coupling component formed on said substrate, at least three of said optical waveguides being connected to said optical coupling element; first and second photonic crystals formed on an optical waveguide coupled to said optical coupling component at an end part thereof coupled to said optical coupling component, said first and second photonic crystals respectively including a structure for reflecting or transmitting an transverse electric mode wave and a structure for reflecting or transmitting a transverse magnetic mode wave; and first and second variable refractive index parts formed respectively in said first and second photonic crystals, said first variable refractive index part and said second variable refractive index part changing a transmittance of said transverse electric mode wave and a transmittance of said transverse magnetic mode wave respectively by changing a refractive index of said first and second variable refractive index parts independently.

Thus, by providing the variable refractive index parts by way of at least the first and second photonic crystals formed on the optical waveguide and by changing the transmittance of light traveling through the optical waveguide by changing the refractive indices of the variable refractive index parts independently, it becomes possible to provide a light control element having a large extinction ratio and operable stably at high speed while miniaturizing the same to the size comparable to the width of the optical waveguide.

According to a ninth aspect of the present invention, there is provided a light control element of any of first through eighth aspect, wherein said photonic crystal includes a defect region.

Thereby, it becomes possible to control the transmittance of an optical signal with a minute refractive index change of 0.01 or less, for example.

According to a tenth aspect of the present invention, there is provided a light control element of ninth aspect, wherein said photonic crystal includes at least two layers of photonic crystal arrays at both sides of said defect region, a refractive index being changed for said defect region or for the entirety of said photonic crystal.

Thus, in addition to the feature of the ninth aspect, the light control element of the tenth aspect of the invention can cause the refractive index change only in the part where the defects are formed.

According to an eleventh aspect there is provided a light control element of ninth aspect, wherein said photonic crystal includes at least two layers of photonic crystal arrays at both sides of said defect region, each of said photonic crystal arrays including the same number of layers.

Thus, in addition to the feature associated with the ninth aspect, the light control element of the tenth aspect of the invention can change the optical path more efficiently by making even the number of the layers in the photonic crystal arrays from the defect region. By doing so, it should be noted that the number of the layers of the photonic crystal from the in/out surface of the light becomes even.

According to a twelfth aspect of the present invention, there is provided a light control element of any of tenth or eleventh aspect, wherein the number of layers of the photonic crystal array is ten or less.

Thus, in addition to the features of the tenth or eleventh aspect, the light control element of the twelfth aspect can deflect the light by a refractive index change while maintaining the optical transmittance, by controlling the number of the layers of the photonic crystal sandwiching the defect region. By doing so, it should be noted that the resonance characteristics of the defect region is changed.

According to a thirteen aspect of the present invention, there is provided a light control element of tenth through twelfth aspect, wherein said photonic crystal has a structure having a wave vector component of a light incident to said defect region through said photonic crystal in a direction other than the direction perpendicular to the elongating direction of the defect region.

Thus, in addition to the feature of the tenth through twelfth aspects, the light control element of the thirteenth aspect of the present invention can control the transmittance for the light incident with a wave vector forming an angle with respect to the two-dimensional defect region formed in the structure of the photonic crystal.

According to the fourteenth aspect of the present invention, there is provided a light control element of any of the third, ninth and thirteenth aspect, wherein the photonic crystal includes plural defect regions of different sizes.

Thus, it becomes possible to expand the equivalent wavelength band, and it becomes possible to construct a light control element such as an optical switch or optical modulator wherein the tolerance to fluctuation of laser oscillation wavelength is increased.

According to a fifteenth aspect of the present invention, there is provided a light control element comprising: a substrate having a photonic crystal structure; a plurality of optical waveguides formed in said photonic crystal structure in the form of a line defect of said photonic crystal structure; and a variable refractive index part formed in an optical coupling part in which said optical waveguides intersect with reach other, said light control element controlling a state of resonance in said optical coupling part by changing a refractive index of said refractive index variable part.

By changing the refractive index of the variable refractive index part set in said optical coupling part where said optical waveguides in the form of defects of the photonic crystal intersect with each other, it becomes possible to construct a light control element such as an optical switch, optical signal delay line, optical filter, and the like, that enables capturing and release of the optical signals.

According to a sixteenth aspect of the present invention, there is provided a light control element comprising: a substrate having a photonic crystal structure; a plurality of optical waveguides formed in said photonic crystal structure of said substrate in the form of a line defect of said photonic crystal structure; and variable refractive index parts set to respective parts of said photonic crystal structure defined by said optical waveguides, said light control element changing a refractive index of said variable refractive index parts independently.

By changing the refractive index of the variable refractive index parts set to the respective parts of the photonic crystal structure defined by the optical waveguides forming a line defect in the photonic crystal structure, it becomes possible to construct a light control element such as an optical switch, optical signal delay line, optical filter, and the like, that allows capturing and release of the optical signals.

According to a seventeenth aspect of the present invention, there is provided a light control device, comprising: a substrate; N×N optical waveguides formed on said substrate so as to cross with each other at intersections distributed two-dimensionally on said substrate; and $N^2$ optical coupling components each provided to one of said intersections of said optical waveguides, a variable refractive index part provided to each of said optical coupling component, each of said variable refractive index part forming a light control element of any of the first through fourteenth aspect of the present invention.

Thus, according to the present invention, it becomes possible to construct a light control device including therein a N×N matrix switch in an extremely minute area. Such a light control element can be disposed on a substrate of an electronic circuit as an optical interconnection switch for use inside a circuit board.

According to the eighteenth aspect of the present invention, there is provided a light control device comprising: a substrate having a photonic crystal structure; N×N×N optical waveguides formed in said photonic crystal structure of said substrate so as to cross with each other at intersections distributed two dimensionally on said substrate and an optical coupling part formed in each of said intersections, said optical coupling part including a photonic crystal forming a variable refractive index part.

Thus, according to the present invention, it becomes possible to construct a light control device including an optical matrix switch formed by N×N×N optical waveguides that form a line defect in the photonic crystal structure such that the light control device has an extremely minute size. Thereby, the light control device of the present invention can be disposed on a substrate of an electronic circuit and can be used for the optical interconnection switch on board.

DETAILED DESCRIPTION OF THE PREFERRED EMBODIMENT

First Embodiment

Hereinafter, a first embodiment of the present invention will be described with reference to FIGS. 1–3.

Figure 1:
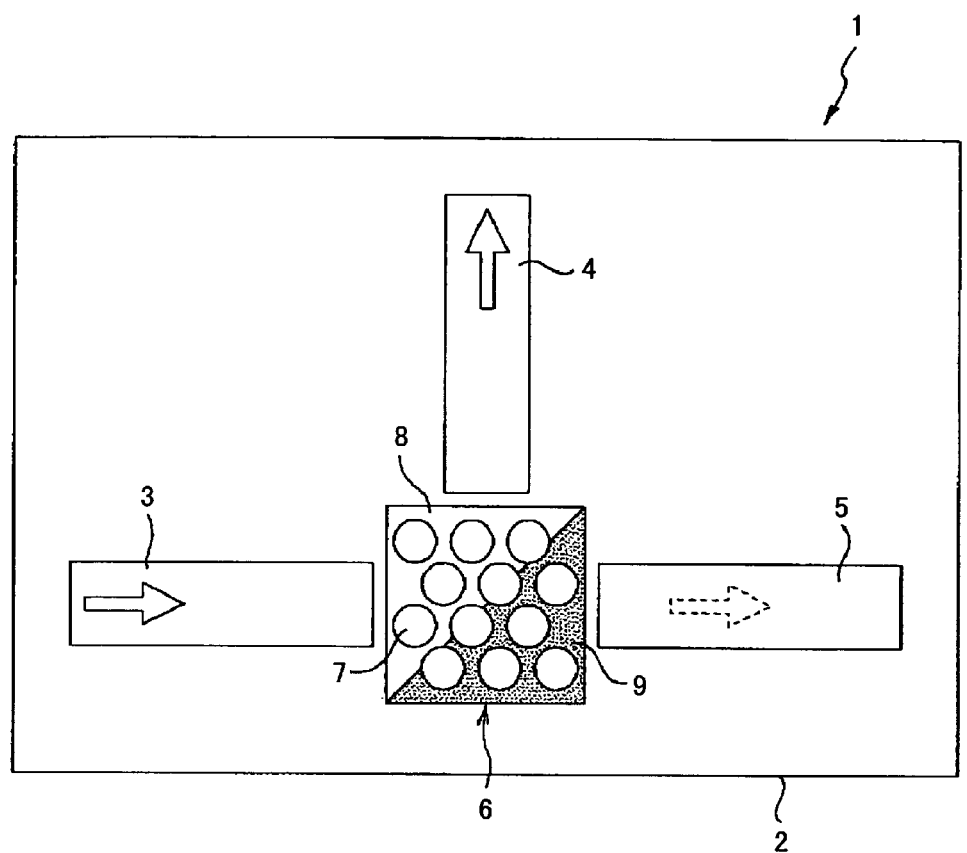
FIG. 1 is a plan view diagram showing an example of a light control element according to a first embodiment of the present invention.

FIG. 1 a plan view shows the general construction of a light control element 1 of the present embodiment.

Referring to FIG. 1, the light control element 1 includes a substrate 2 on which three optical waveguides 3, 4 and 5 are formed, wherein the optical waveguides 3, 4 and 5 are connected with each other by an optical deflection part 6 acting as an optical coupling component. In the illustrated example, the optical waveguide 3 serves for the incident side optical waveguide, while the exit side optical waveguides 4 and 5 are provided in a perpendicular relationship with each other. It should be noted that the number of the optical waveguides is not limited to three but four or more optical waveguides may be provided. Further, the incident side optical waveguide and the exit side optical waveguide are not necessarily connected to the optical deflection part 6 and the optical coupling may be achieved via a spatial propagation of the optical signals.

In the optical deflection part 6, there is formed a photonic crystal 7, wherein the photonic crystal 7 is formed by a periodic distribution of refractive index (dielectric constant) on the substrate 2 called optical atoms. In the photonic crystal 7, it is possible to form a photonic bandgap, which is a forbidden band of photons, by adjusting the periodic structure of the optical atoms appropriately. Thereby, the characteristics of the photonic crystal are determined by the difference of dielectric constant between the substrate 2 and the optical atoms, the arrangement of the optical atoms, the relationship between the optical wavelength and the size of the optical atoms, the distance between the optical atoms, and the like. Thus, change of any of these causes a change of characteristics of the photonic crystal 7. Particularly, it becomes possible to change the photonic band structure in the photonic crystal having a photonic bandgap, by changing the refractive index of the optical atoms or the substrate More specifically, by changing the transmittance of the photonic crystal 7 by way of changing the refractive index thereof, it becomes possible to change the photonic crystal from a transparent body before the refractive index change to a reflective body after the refractive index change.

In order to utilize this phenomenon for control of light, the photonic crystal 7 of the present embodiment has a structure capable of changing the refractive index in the optical deflection part 6. Such a change of the refractive index can be caused by electro-optic effect; thermo-optic effect; carrier plasma effect of semiconductor films, optical Kerr effect, and the like. While the phenomenon changes depending on the material, the photonic crystal 7 is formed by the material that changes the refractive index thereof.

With regard to the optical deflection part 6, it should be noted that the optical deflection part 6 is dividend into regions 8 and 9 by a diagonal line, wherein the regions 8 and 9 forms a variable refractive index part that changes the refractive index thereof independently by way of application of electric field or optical irradiation. With the changer of the refractive index, the photonic crystal changes the reflectivity, and thus, it becomes possible to control the transmission and reflection of the light with such a construction.

For example, consider the case in which an incident light comes in to the photonic crystal 7 of the optical deflection part 6 from the optical waveguide 3 with a wavelength chosen such that the photonic crystal structure 7 transparent to the incident light. When no refractive index change is caused in the regions 8 and 9, the incident light passes merely through the photonic crystal 7 forming the optical deflection part 6 to the optical waveguide 5 provided at the exit side.

On the other hand, when the refractive index of the region 9 is changed such that the propagation wave vector of the incident light falls in the photonic bandgap, the incident light is reflected by the region 9 to the optical waveguide 4 disposed perpendicularly to the optical waveguide 5. Thereby, efficient optical reflection is caused when the region 9 causing the refractive index change is formed in the form of a prism mirror. In addition, it should be noted that the region of refractive index change can be adjusted arbitrarily in the construction of FIG. 1. Thus, it is possible to deflect the path direction of the light in an arbitrary direction.

Thus, the light control element 1 of the present embodiment, not relying upon mechanical movement of a mirror, has a distinct advantage of stable and high speed optical path deflection as compared with the conventional art that changes the mirror by using micro machine technology.

Further, it should be noted that such optical reflection as in the present embodiment is particularly useful for the means of optical path switching, as such a construction can control the traveling direction of light of a particular wavelength without causing optical loss. Of course, the light control element 1 of the present embodiment is not limited to such a specific example but may be used also for optical modulator, optical wavelength selector, optical signal divider on the time axis, optical pulse generator, and the like.

Further, it is also effective to provide a quasi phase matching structure in the light control element by using a $LiNbO_3$ substrate, a $LiTaO_3$ substrate or a $KTiOPO_4$ substrate and providing a polarization reversal region in addition to the variable refractive index part, such that the light control element is used in combination with a non-linear optical effect caused by such a quasi phase matching structure. In this case, a specific light such as an SHG light or a four-wave mixed light formed by the non-linear optical effect or the original incident light is subjected to the optical path deflection in the minute region by way of selective reflection or transmission. For such a quasi phase matching, not only normal quasi-phase matching but also anti-bonding quasi-phase matching can be used. Thereby, it is effective to increase the effective non-linear optical constants by reducing the group velocity by the photonic crystal. Further, it is also effective to construct a non-linear excitation structure in which the quasi phase matching structure is not necessary by coinciding or changing the phase velocity of the photonic crystal itself or to form the quasi-phase matching structure such that the phase velocity change is taken into consideration.

It should be note that, at the time of the polarization reversal processing in the structure having a void such as the holes or columns forming the photonic crystal or grooves formed perpendicularly to the substrate separately to the foregoing holes or columns by applying a voltage from an electrode or causing ion diffusion, the parts where the polarization reversal processing is made are separated, and thus, it becomes possible to provide the quasi phase matching structure with a pitch smaller than the conventional quasi phase matching structure. Further, by applying a voltage from the electrodes provided in the holes or columns of the photonic crystal or in the grooves, which are formed perpendicularly to the substrate separately to the holes or the columns, it becomes possible to separate the parts where the voltage is applied from each other.

Meanwhile, it is noted in the example of FIG. 1 that the photonic crystal 7 is formed on the entire surface of the optical deflection part 6, while this is not the prerequisite and there is no need of forming the photonic crystal 7 on the region 8 as long as the light control element 1 is the device in which the optical waveguides 4 and 5 are branched from the optical waveguide 3. When removing the photonic crystal from the region 8, it should be noted that the photonic crystal structure 7 forming the region 9 is not cut obliquely. Instead, the photonic crystal structure 7 is tilted or rotated on the substrate 2 such that the incident light hits the desired incident surface of the photonic crystal 7. In the case the photonic crystal forms a triangular lattice and the lattice plane forms an angle of 60 degrees or 30 degrees, the incident light is reflected with a reflection angle of 60 degrees or 30 degrees without tilting or rotating the photonic crystal 7, while if it is desired to cause the reflection with a reflection angle of 45 degrees, the photonic crystal 7 should be rotated for the reflection angle of 45 degrees. Similarly, in the case there is formed a tetragonal lattice in the photonic crystal 7 in which the lattice planes form an angle of 90 degrees, a reflection with the reflection angle of 45 degrees can be achieved without rotating the photonic crystal, while in the case of reflecting the light with an arbitrary reflection angle, it is necessary to tilt the photonic crystal with an angle corresponding to the desired reflection angle.

In the example of FIG. 1, a total-reflection type optical waveguide similar to an optical fiber is used for the optical waveguides 3, 4 and 5, while it is also possible to use an optical waveguide in which the photonic crystal 7 is formed as will be explained later. Further, it is possible to use an optical waveguide in which a line defect is introduced in a part of the photonic crystal for the optical waveguides 3, 4 and 5.

It should be noted that the light control element 1 of the present embodiment can be formed for example by forming circular holes in a semiconductor film having a thickness corresponding to the wavelength of the light in the optical waveguide by way of photolithographic process and etching process. In this case, a two-dimensional array of the circular holes filled with the air is formed in the semiconductor film having a refractive index of 3. Here, it should be noted that the distribution of the dielectric constant is not limited to circle, but a square or polygonal distribution can be used also for the dielectric constant.

Such a semiconductor film can be formed by a selective etching process of an InP substrate or a GaAs substrate formed with a quantum well or strained quantum well, such that there is formed a film exposed to the air at the circular holes. Further, it is also possible to form the photonic crystal 7 by using an SOI (silicon-on-insulator) substrate having a silicon film formed on an $SiO_2$ film having a refractive index of 1.45 with a thickness corresponding to the wavelength of the light guided through the optical waveguide. Such a structure is reported by various authors. Because an SOI substrate is developed for electronic circuits, the crystal quality is superb with the SOI substrate. Further, the use of an SOI substrate is advantageous in terms of cost.

As a result of the total reflection caused between the air and the semiconductor layer, the light is confined with regard to the up and down directions in such a photonic crystal 7, while in the plane parallel to the thin semiconductor film, the two-dimensional photonic crystal interacts with the light. Thus, by coupling the optical wave to such a slab-type two-dimensional photonic crystal, it is possible to form the light control element 1 of the present embodiment.

Further, it should be noted that such a photonic crystal can be formed also in the thin film of an inorganic crystal such as $LiNbO_3$ (lithium niobate), $TiNbO_3$ (titanium niobate), KTP ($KTiOPO_4$), and the like, or in a ceramic film such as PZT, PLZT, and the like, formed on a low refractive index medium. Alternatively, such a thin film may be used in the form of an air bridge structure in which the film surface is exposed to the air. Further, it is also possible to form a photonic crystal on a low dielectric film by forming thereon a liquid crystal layer having a nematic structure or smectic structure, or an organic molecular film or organic crystalline film such as an azo dye, a stilebenzen dye, dust, and the like. Of course, the photonic crystal can be formed to have a two-dimensional structure. For example, such a two-dimensional photonic crystal can be formed by inserting a refractive index modulation structure of an organic material inside a three-dimensional photonic crystal formed by laminating semiconductor stripes.

The inventor of the present invention has confirmed the operational principle of the light control element 1 of the present embodiment by a computer simulation. Hereinafter, the result of the computer simulation will be explained with reference to FIG. 2.

First, the change of the photonic band structure with the change of the refractive index is confirmed by a photonic band analysis.

Figure 2A:
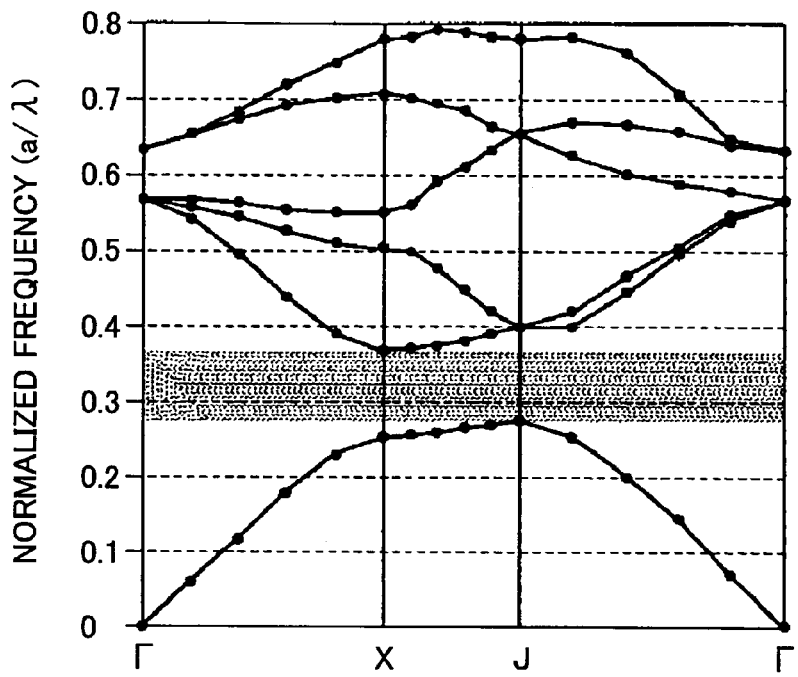
FIG. 2A is a band diagram of the photonic crystal used in the device of FIG. 1 for the case of the refractive index of 1.4.
Figure 2B:
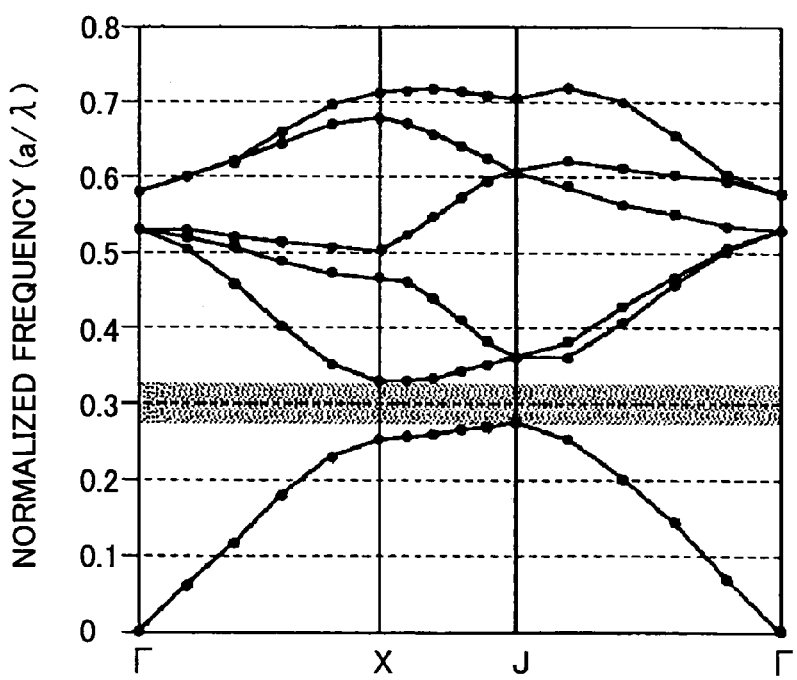
FIG. 2B is a band diagram of the photonic crystal used in the device of FIG. 1 for the case of the refractive index of 1.6.

FIGS. 2A and 2B show the results of simulation obtained by a plane wave expansion method, which is one of the analysis methods of photonic band structure, for the case a photonic crystal structure is formed on a substrate having a refractive index of 3.5 in the form of a triangular lattice and that the triangular lattice is formed by an array of circular holes filled with a medium having a refractive index of 1.4 or 1.6. It should be noted that such a structure can be realized by filling a liquid crystal in the circular holes formed in a semiconductor substrate. In the calculation, the radium r of the circular hole is determined with respect to a pitch a between the circular holes by the relationship r=0.9 a.

In FIGS. 2A and 2B, it should be noted that the analysis is made by assuming a two-dimensional structure and the photonic band calculation is made for the transverse electric (TE) mode in which the electric field exists in the direction of the plane of the substrate.

FIG. 2A shows the band diagram for the case the refractive index is 1.4, while FIG. 2B is the band diagram show the case the refractive index is 1.6. In FIGS. 2A and 2B, it should be noted that the hatched region shows the photonic band gap in which optical propagation is prohibited for all the wavenumbers within the two-dimensional plane.

Referring to FIGS. 2A and 2B, it can be seen that the bandgap has shifted in the case of FIG. 2B as compared with the case of FIG. 2A in the direction of smaller normalized frequency. This means that the light having a normalized frequency of 0.35 cannot pass through the photonic crystal when the refractive index thereof is 1.4 because the light of the normalized frequency of 0.35 falls in the bandgap, while the same light passes through the photonic crystal when the refractive index is 1.6, as the light having the normalized frequency of 0.35 is located outside the bandgap of the same photonic crystal having the refractive index of 1.6. Thus, from the photonic band diagrams of FIGS. 2A and 2B, it will be understood that the optical transmission of the light can be controlled by controlling the refractive index of the photonic crystal 7 used in the light control element 1 of FIG. 1.

It should be noted that such a light control element 1 can be also constructed by using a semiconductor substrate and a liquid crystal.

More specifically, such a photonic crystal can be formed by forming an array of minute circular holes having a diameter of 1 μm or less in correspondence to the optical wavelength in a substrate of GaAs or Si by a photolithographic process and an etching process wherein the circular holes thus formed are filled with a liquid crystal. Most of the liquid crystals such as a nematic liquid crystal show the anisotropy of refractive index of about 0.2 that changes with an electric field applied to the liquid crystal.

By using a thin film slab structure, optical confinement is achieved in the upper and lower directions, and thus, there optical leakage is prevented. Thereby, it becomes possible to construct the photonic crystal 7 used in the light control element 7.

For the thin film slab structure, it is possible to use an SOI substrate, wherein it is preferable to set the thickness of the slab part to be 1 μm or less. Most preferably, the slab has a thickness causing single single-mode propagation in the plane perpendicular to the thin film slab structure.

Thus, by using such a construction, it is possible to obtain the light control element 1 that changes the refractive index inside the circular holes.

Alternatively, it is possible to form circular pillars of Si on an SOI substrate and fill the space between the Si pillars by a liquid crystal, in combination with the optical waveguide formed by an organic material. In such a structure, the pillars of high dielectric material are surrounded by the liquid crystal of low dielectric material. By optimizing the design, it is also possible to achieve the effect explained as before.

According to such a construction, it becomes possible to form an optical waveguide of low refractive index, and it is possible to achieve optical coupling with optical fibers easily.

Further, it should be noted that the light control element 1 can be produced also by the process steps of: forming an array of minute holes having a depth of about 1 μm on a surface of a Z-cut single-crystal substrate of $LiNbO_3$ by a dry etching process while using a an etching gas containing C and F together with a metal mask; and bonding the foregoing $LiNbO_3$ substrate thus formed with the minute holes with a silicon substrate carrying thereon a thermal oxide film, and a bonding process achieved for the $LiNbO_3$ substrate and the thermal oxide film on the Si substrate.

Thereafter, the rear surface of the $LiNbO_3$ substrate is subjected to any of mechanical polishing process, CMP process or an ion polishing process such that the thickness of the $LiNiO_3$ substrate is reduced to 1 μm. With this, the minute holes thus formed penetrate through the $LiNbO_3$ substrate. By filling the minute holes by a silicon oxide, silicon nitride or a polymer film in advance, it is possible to reduce the damaging of the minute holes at the time of the polishing process.

Thereafter, the silicon oxide film and also the material filling the minute holes are removed partially by a wet etching process while using a resist pattern as a mask, and there is obtained a photonic crystal of air gap type on a stab of $LiNbO_3$.

In such a photonic crystal formed on the $LiNbO_3$ slab by the minute holes, it is advantageous to provide electrodes on the top and bottom surfaces of the $LiNbO_3$ substrate in the vicinity of the minute holes or on the minute holes for applying a strong electric field to the minute space inside the minute holes. Further, it is possible to provide an electric drive element on the silicon substrate and achieve an electric connection between the electrodes on the $LiNbO_3$ substrate and the electric drive element by electrophoresis. With this, it is possible to produce a light control element having a composite substrate and a unitary electric drive element provided thereon.

In place of $LiNbO_3$, it is possible to use other inorganic crystals such as $TiNbO_3$, KTP, SBN (SrBaNb complex oxide), and the like, an organic material of high refractive index, or an inorganic ceramic such as PZT, PLZT, $BaTiO_3$, and the like. In these cases, too, the minute holes are formed by the dry etching process. Further, it is also possible to use a $LiNbO_3$ substrate, a MgO-doped $LiNbO_3$ substrate, a GaAs substrate, and the like.

Further, it is possible to provide the optical waveguide in a part of the photonic crystal of $LiNbO_3$ by proton diffusion process or titanium diffusion process. Alternatively, it is possible to form a ridge type or buried type optical waveguide by a dicing process or dry etching process. Further, the light control element 1 can be formed in the form of a photonic crystal layer or a slab waveguide in which the photonic crystal layers are stacked in plural layers, or in the form of a three-dimensional optical waveguide.

Furthermore, it should be noted that the thin film of $LiNbO_3$ or PZT or the thin film forming the photonic crystal is not limited to a crystalline material, but may be formed of a precursor material formed by using a sol-gel process or a dry etching process of such a precursor material.

In addition, it is possible to fill a liquid crystal in the minute holes thus formed on the silicon substrate by a dry etching process. Particularly, it is effective to use a photonic crystal of liquid crystal formed in such a manner that the liquid crystal molecules are aligned in the direction perpendicular to the substrate and formed while applying a lateral electric field to the liquid crystal. Further, it is also possible to fill the liquid crystal partially to a substrate having an electro-optical effect such as a $LiNbO_3$ substrate for causing an electro-optic effect in the photonic crystal in addition to the formation of the photonic band structure.

In order to confirm the occurrence of transmittance change, a simulation has been made for the model photonic crystal explained before with reference to the plane wave expansion method by using a finite difference time domain (FDTD) method. The simulation has been conducted based on the model explained before by setting the optical wavelength to 1.3 μm, the pitch a of the circular holes to 0.44 μm and the diameter r of the circular holes to 0.198 μm (2r=0.9 a). The photonic crystal 7 is assumed to include ten layers of optical atoms, wherein this corresponds to an extremely minute layer thickness of 4 μm.

Figure 3:
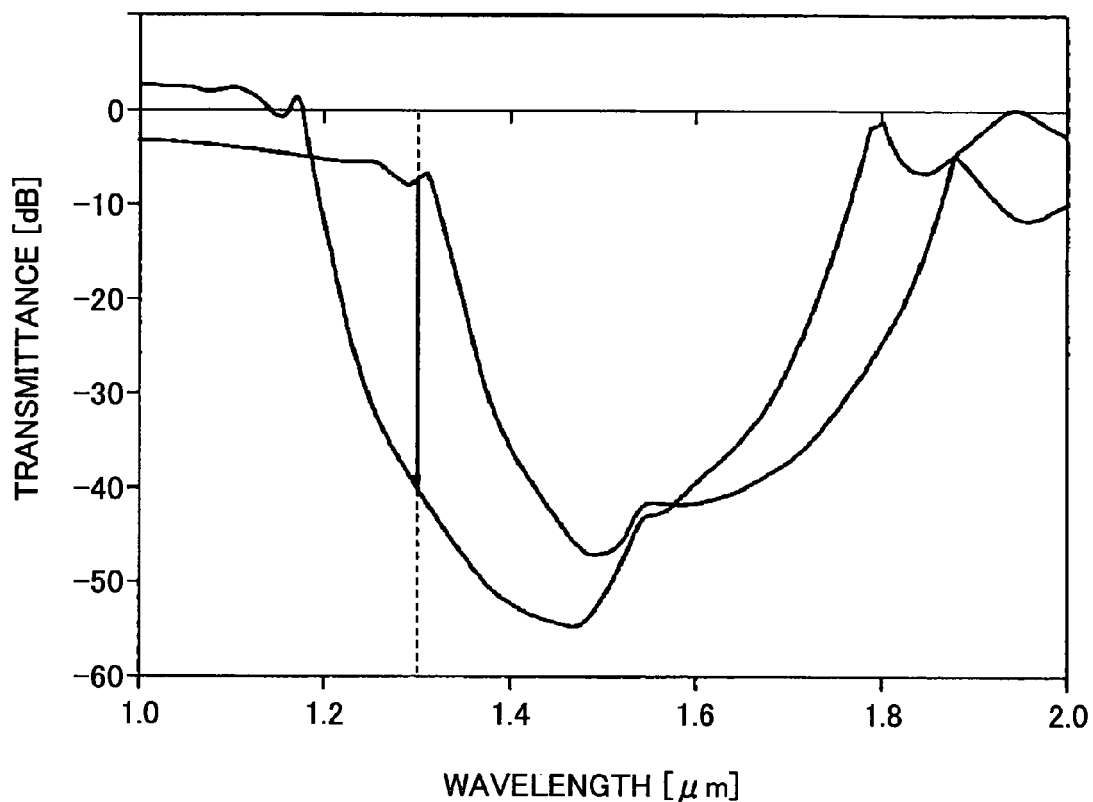
FIG. 3 is a characteristic diagram showing the transmittance of the photonic crystal to the light of various wavelengths.

FIG. 3 shows the relationship between the transmittance of the photonic crystal 7 and the wavelength of the incident light for the case of injecting a plane wave light in the Γ-X direction. It should be noted that the transmittance is calculated by the power ratio between the incident side and the exit side.

Referring to FIG. 3, it can be seen that there is caused a changer of transmittance exceeding 35 dB at the wavelength of 1.3 μm as a result of the refractive index modulation, while this value of transmittance change or extinction ratio is sufficient for controlling the transmittance and reflection of light in the light control element 1 of the present embodiment. Further, it is noted that the extinction ratio exceeding 30 dB can be achieved over a wide wavelength range of 50 nm. Because the satisfactory extinction ratio is achieved over the wide wavelength range, the light control element 1 of the present embodiment provides a distinct advantage that it is not necessary to control the oscillation wavelength of the laser diode used for the optical source. It should be noted that the oscillation wavelength of the laser diode changes easily by heating of the leaser diode. Further, in the photonic crystal 7, not only a plane wave light but also an optical beam having a large angular component of the wave vector is reflected efficiently as long as the wavelength thereof falls in the photonic bandgap.

Second Embodiment

Figure 4:
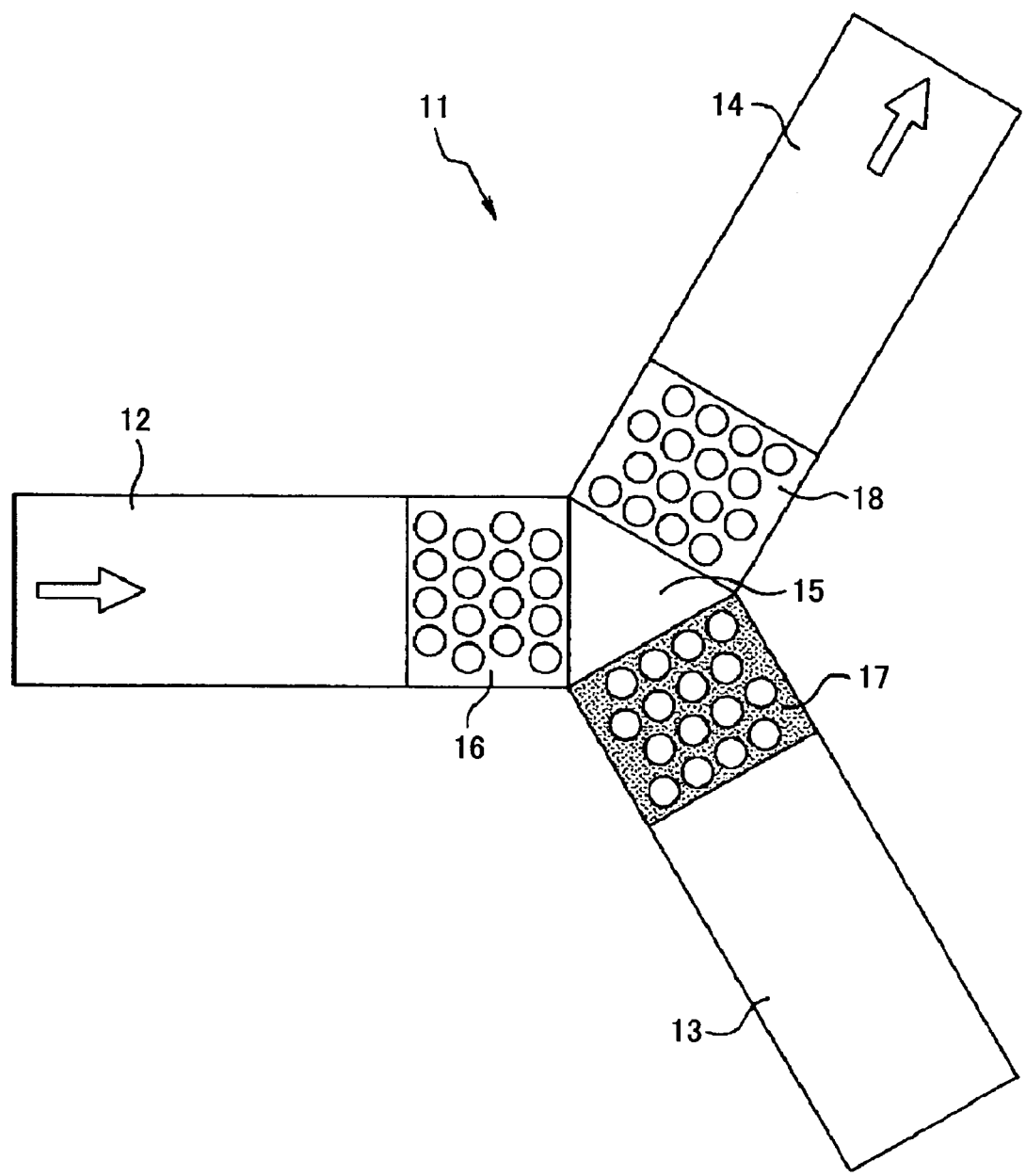
FIG. 4 is a plan view diagram showing the construction of a light control element according to a second embodiment of the present invention.

Next, a second embodiment of the present invention will be described with reference to FIG. 4 showing a plan view of a light control element 11 according to the second embodiment.

Referring to FIG. 4, the light control element 11 of the present embodiment is constructed on a substrate not illustrated and includes three optical waveguides 12, 13 and 14 formed on the substrate with an mutual angle of 120 degrees, wherein there is provided an optical deflection part 15 on the substrate at the center of the optical waveguides 12, 13 and 14 in the form of an equilateral triangle. Thereby, each end of the optical waveguides 12, 13 and 14 is connected to the optical deflection part 15.

It should be noted that the ends of the optical waveguides 12, 13 and 14 connected to the optical deflection part 15 carry thereon photonic crystals 16, 17 and 18 respectively, wherein the photonic crystals 16, 17 and 18 constitute a variable refractive index part that can control the transmittance of the respective optical waveguides 12, 13 and 14 by changing the refractive index thereof independently to each other.

In the illustrated example, it is noted that there are three optical waveguides connected to the optical deflection part 15, wherein it should be noted that the number of the optical waveguides is not limited to three but four or more optical waveguides may be connected to the optical deflection part 15.

Because of the effect of width of the optical waveguides 12, 13 and 14, there is caused a problem of poor coupling coefficient, when a large number of optical waveguides are connected to the optical deflection part 15 and the area of the optical deflection part 15 is increased, as there is caused spreading of light as a result of diffraction. Thus, it is preferable not to provide more than four such optical waveguides on the substrate.

The optical waveguides 12, 13 and 14 may have the width of a single mode optical waveguide, while it is also possible to construct these optical waveguide to have a width forming a multimode waveguide. Generally, multimode optical signals are not suitable for processing in an optical circuit that uses total reflection, while in the case of the present invention that uses the photonic crystals 16, 17 and 18 for the mirror, it becomes possible to reflect optical radiation having any wave vector direction with high reflectance in a predetermined deflection direction.

Third Embodiment

Figure 5:
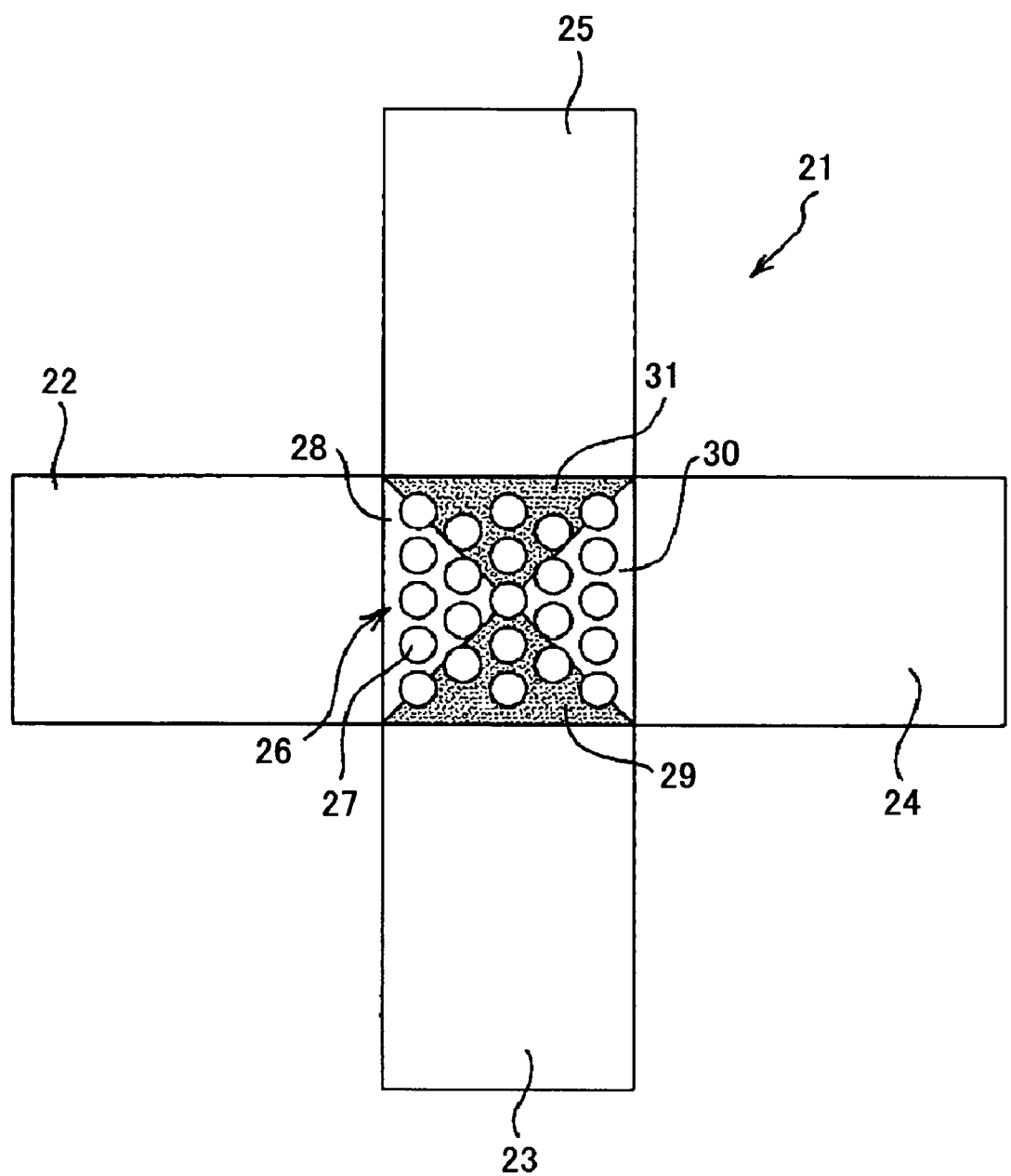
FIG. 5 is a plan view diagram showing the construction of a light control element according to a third embodiment of the present invention.

FIG. 5 shows the construction of a light control element 21 according to a third embodiment of the present invention in a plan view.

Referring to FIG. 5, the light control element 21 of the present embodiment is constructed on a substrate not illustrated and includes four optical waveguides 22–25 formed on the substrate in a cross pattern crossing with each other perpendicularly. At the center of the optical waveguides 22–25, there is provided an optical deflection part 26 having a square form as an optical coupling component, and each of the optical waveguides 22–25 has its end connected to such an optical deflection part 26. Here, it should be noted that the number of the optical waveguide is not limited to four but five or more optical waveguides may be provided. On the other hand, when the number of the optical waveguides is increased, there is caused correspondence increase of the connection part similarly to the case of the second embodiment, and there is a possibility that optical loss is caused as a result of optical diffraction. Thus, it is desirable to provide about four such optical waveguides on the substrate as illustrated in FIG. 5.

In the optical deflection part 6, it should be noted that there is formed a photonic crystal 27 by forming a periodic distribution of refractive index or dielectric constant on the substrate. Further, the optical deflection part 26 is divided into four regions 28–31 each having a form of right-angled isosceles triangle by two intersecting diagonal lines, wherein each of the regions 28–31 can change the refractive indices thereof independently. Thereby, the regions 28–31 form a variable refractive index part constituting a photonic crystal mirror.

Thus, when there is caused no refractive index change in any of the regions 28–31 in the light control element 21 of the present embodiment, the light incident from the optical waveguide 22 passes straight through the optical deflection part 26 and exits through the optical waveguide 24.

In the case the refractive indices of the regions 30 and 31 are changed and the optical transmittance is changed accordingly, there is formed a reflecting body (photonic crystal mirror) of a prism-like form in the present embodiment, and the light incident from the optical waveguide 22 is reflected at the interface between the regions 30 and 31 of the optical deflection part 26 to the optical waveguide 23.

Similarly, when the refractive index is changed in the regions 29 and 30, the incident light is reflected to the optical waveguide 25.

Thus, as a result of combination of the regions 28–31 changing the refractive index, it becomes possible to deflect the traveling direction of the incident light from the optical waveguide 22 in an arbitrary desired direction.

Fourth Embodiment

Figure 6:
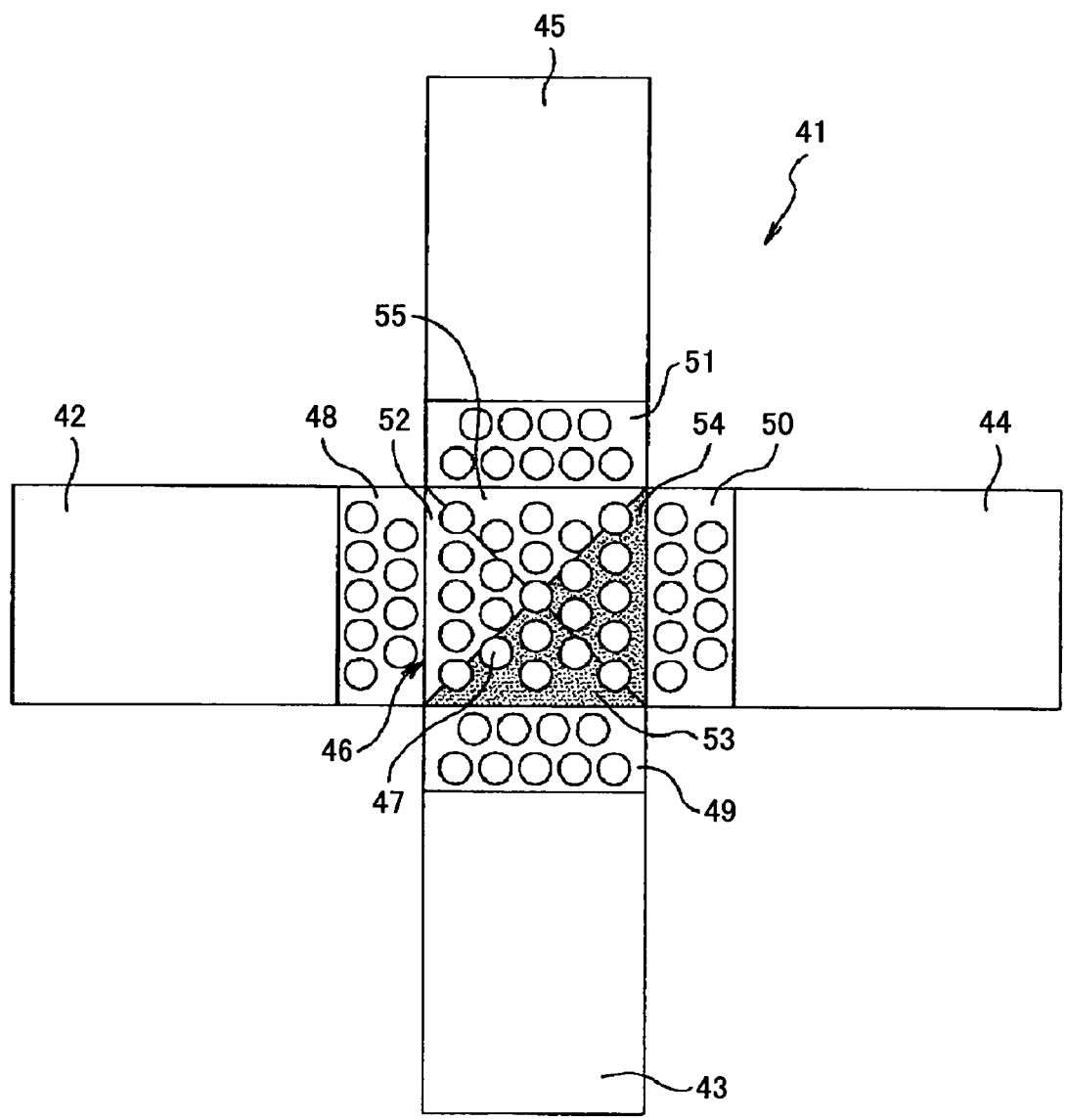
FIG. 6 is a plane view diagram showing the construction of a light control element according to a fourth embodiment of the present invention.

FIG. 6 shows the construction of a light control element 41 according to a fourth embodiment of the present invention in a plan view.

Referring to FIG. 6, the light control element 41 is constructed on a substrate (not shown) and includes four optical waveguides 42–45 on the substrate in a cross-pattern such that the optical waveguides 42–45 cross perpendicular with each other. Further, there is provided an optical deflection part 46 of square form at the center of the optical waveguides 42–45 as an optical coupling component. Thereby, each of the optical waveguides 42–45 has an end part connected to the optical deflection part 46.

In the optical deflection part 46, there is formed a photonic crystal 47 similarly to the previous embodiment, wherein it should be noted that there are formed further photonic crystals 48–51 on respective end parts of the optical waveguides 42–45 connected to the optical deflection part 46.

The optical deflection part 46 is divided into four regions 52–55 each having a right-angled isosceles triangular form by two mutually intersecting diagonal lines, wherein each of the regions 48–51 can change the refractive indices thereof independently from each other and forms a variable refractive index part. In the case of using an electro-optic effect by using an electro-optic material for changing the refractive index, such an independent change of the refractive index can be achieved easily by forming independent electrodes on the foregoing regions 48–51 and apply electric field via such electrodes independently. In the case of using thermo-optic effect, such change of the refractive indices may be achieved by providing heaters to the regions 48–51 separately from each other.

In such a construction, the incident light can be deflected to any desired direction by combining the refractive index change caused in the variable refractive index parts (regions 52–55; photonic crystals 48–51).

When the refractive indices of the variable refractive index parts formed by the photonic crystals 49 and 51 are changed, for example, the optical signal incident from the optical waveguide 42 travels straight and enters to the exit side optical waveguide 44. Although such straight propagation of the optical signal is achieved without such a refractive index change in the variable refractive index parts of the photonic crystals 49 and 51, such a refractive index change is still desirable in view of the effect of suppressing the leakage of light to the optical waveguides 43 and 45 by way of diffraction. Thus, in the present embodiment, the photonic crystals 49 and 51 are provided for improving the optical coupling efficiency.

Further, in the construction of FIG. 6, it is possible to deflect the light from the optical waveguide 42 to the optical waveguide 45 by changing the variable refractive index parts formed by the photonic crystals 49 and 50. On the other hand, in such a structure in which four or more optical waveguides are connected, there arises a problem that the light in the optical waveguide 42 cannot be injected to the optical waveguide 45 with high efficiency due to back reflection. Thus, in the present embodiment, the refractive indices of the variable refractive index parts (regions 53 and 54) are changed to form a reflecting body having a prism form. With this, the light in the optical waveguide 42 is injected to the optical waveguide 45 with high efficiency.

Thus, in the present embodiment, the light in the incident side optical waveguide is injected to the optical waveguide of any arbitrary direction with high efficiency by combining the features of the second and third embodiments.

Fifth Embodiment

Figure 7:
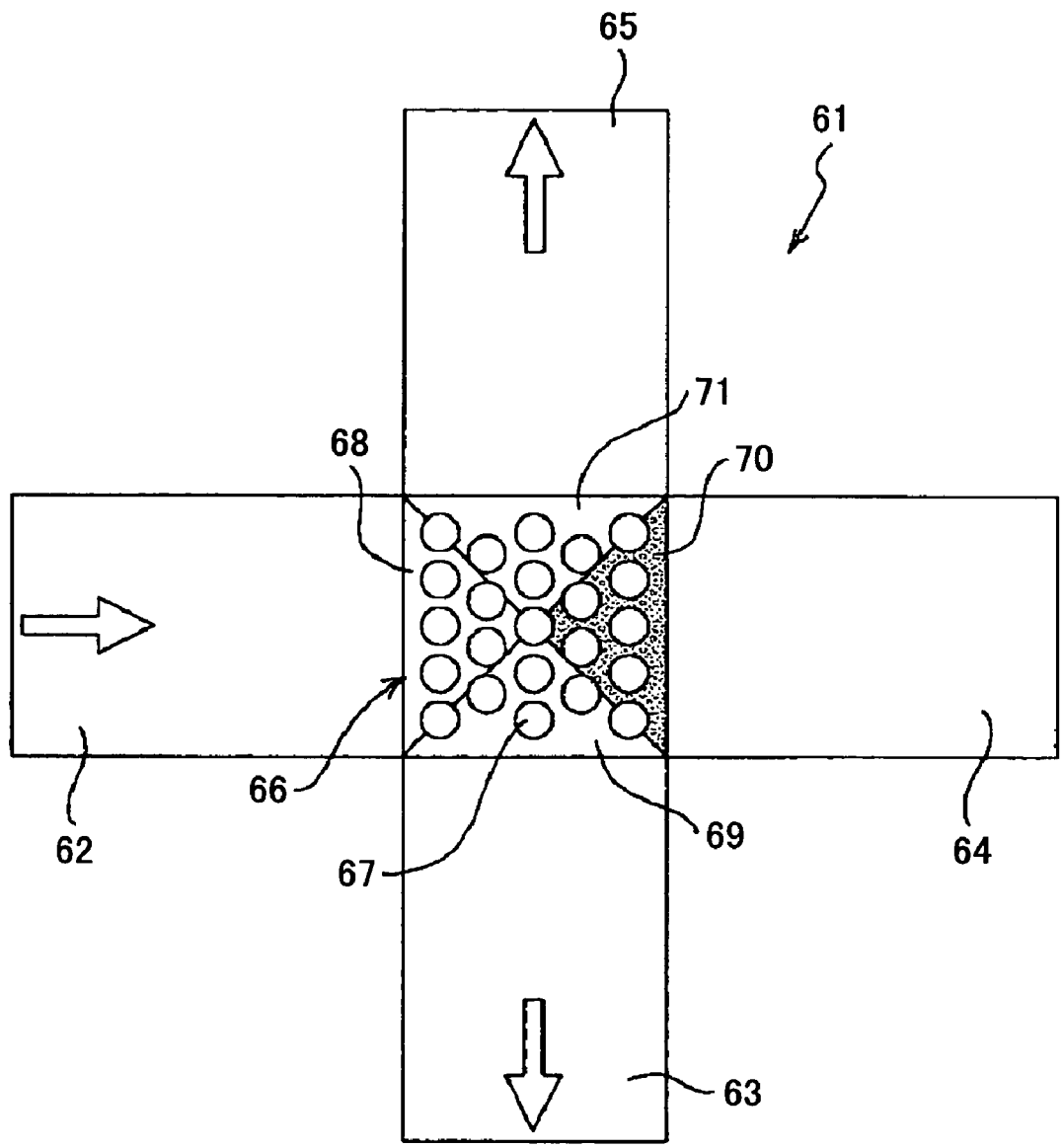
FIG. 7 is a plan view diagram showing the construction of a light control element according to a fifth embodiment of the present invention.

Next, a light control element 61 according to a fifth embodiment of the present invention will be described with reference to FIG. 7 showing the light control element 61 in a plan view.

Referring to FIG. 7, the light control element 61 includes four optical waveguides 62–65 on a substrate not illustrated in the form of a cross pattern such that the optical waveguides 62–65 cross perpendicular with each other. Further, there is provided an optical deflection part 66 of square form at the center of the optical waveguides 62–65 as an optical coupling component. Thereby, each of the optical waveguides 62–65 has an end part connected to the optical deflection part 66.

Here, it should be noted that the number of the optical waveguide is not limited to four but five or more optical waveguides may be provided. On the other hand, when the number of the optical waveguides is increased, there is caused correspondence increase of the connection part similarly to the case of the second embodiment, and there is a possibility that optical loss is caused as a result of optical diffraction. Thus, it is desirable to provide about four such optical waveguides on the substrate as illustrated in FIG. 7.

In the optical deflection part 66, there is formed a photonic crystal 67 in the form of a periodic distribution of refractive index or dielectric constant on the substrate. Further, the optical deflection part 66 is divided into four regions 68–71 each having a form of right-angled isosceles triangle by two intersecting diagonal lines, wherein each of the regions 68–71 can change the refractive indices thereof independently. Thereby, the regions 68–71 form a variable refractive index part that controls an optical transmittance of the light passing therethrough in response to the refractive index change.

Thus, when the reflectance of the region 70 is changed selectively by way of inducing a refractive index change, there is formed a T-shaped branched structure at the part where the optical waveguide 62 and the optical deflection part 66 are connected, and the light in the optical waveguide 62 is branched to the optical waveguides 63 and 65.

Conventionally, such an optical branching structure of low optical loss that uses total reflection has been constructed by using single-mode optical waveguides (IEEE Lightwave Techonol. Vol.17, p.1682, 1999). In the case of a multimode optical waveguide, on the other hand, it is difficult to achieve high efficiency total reflection with regard to the higher modes, and large optical loss is inevitable. In the case of the present embodiment, on the other hand, it becomes possible to achieve large reflectance also at higher modes by using a photonic crystal array for the reflector.

Sixth Embodiment

Figure 8:
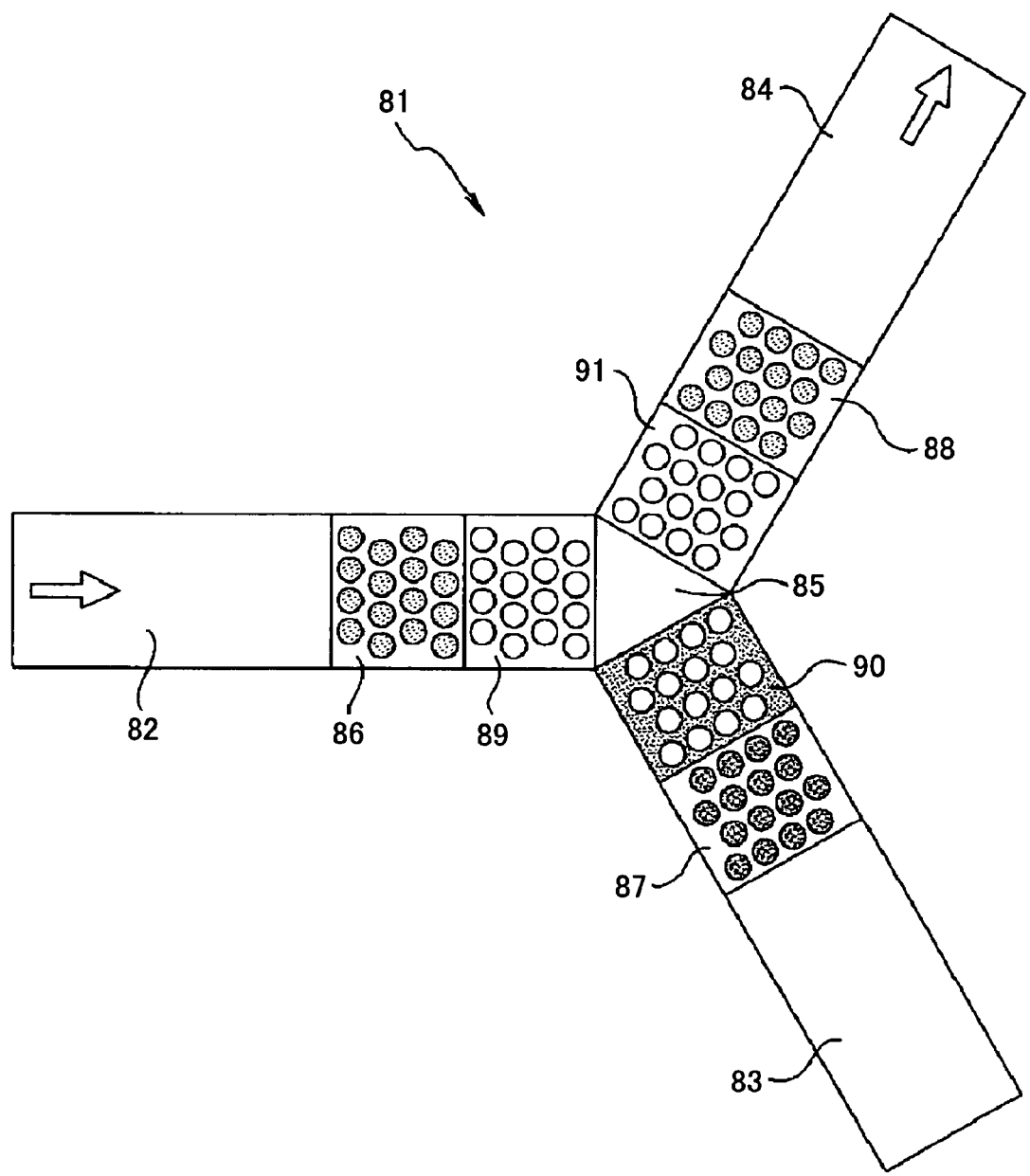
FIG. 8 is a plan view diagram showing the construction of a light control element according to a sixth embodiment of the present invention.

Next, a light control element 81 according to a sixth embodiment of the present invention will be described with reference to FIGS. 8 and 9, wherein FIG. 8 is a plan view showing the construction of the light control element 81 of the present embodiment.

Referring to FIG. 8, the light control element 81 is constructed on a substrate not illustrated and includes three optical waveguides 82–84 formed on the substrate with a mutual angle of 120 degrees for example. At the center of the optical waveguides 82–84, there is provided an optical deflection part 85 in the form of an equilateral triangular form as an optical coupling component, wherein respective ends of the optical waveguides 82–84 are connected to the optical deflection part 85.

On the foregoing edge parts of the optical waveguides 82–84 connected to the optical deflection part 85, there are formed outer photonic crystals 86–88 and inner photonic crystals 89–91 respectively, wherein each of the optical waveguides 86–88 and 89–91 has a width equal to the width of the corresponding optical waveguides and is capable of changing the refractive index thereof independently to each other.

Here, it should be noted that the outer photonic crystals 86–88 and the inner photonic crystals 89–91 are formed with different arrangement and different period, such that the photonic crystals 86–88 can change the reflectance with respect to a transverse electric (TE) mode wave while the photonic crystals 89–91 can changes the reflectance with respect to a transverse magnetic TM mode wave.

In the illustrated example, it should be noted that there are provided three optical waveguides connected to the optical reflection part 15, while the number of the optical waveguides is not limited to three but four our more optical waveguides may be provided. Because of the effect of the width of the optical waveguides 12, 13 and 14, there occurs an increase of area in the optical waveguide part 85 and hence corresponding deterioration of the coupling coefficient caused by diffusion of the light as a result of diffraction, when the number of the optical waveguides is increased. Thus, it is preferable that the number of the optical waveguides on the substrate does not exceed about four.

It should be noted that photonic crystals generally have the nature of large polarization dependence with regard to the TE mode light wave and TM mode light wave. While it is possible to form a bandgap for both of the TE and TM mode polarization by optimizing the array of the optical atoms, the restriction imposed to such an array is strict and it is difficult to design a structure having a large bandgap for both of the TE mode and TM mode polarization by using a periodic structure in which the diffraction index difference is small.

In view of the situation noted above, the present invention avoids the structure that forms a bandgap for both of the TE mode polarization and TM mode polarization but uses a structure in which bandgap is formed separately for each of the TE mode polarization and TM mode polarization. With this, the tolerance at the time of formation of the photonic crystal is increased. Further, by conducting reflectance control for the TE mode polarization and the TM mode polarization separately, it becomes possible to separate one of the polarization components from the incident light wave supplied to the optical waveguide 82.

For example, it is possible in the structure of FIG. 8 to cause transmission of both the TE mode polarization and TM mode polarization through the optical waveguide 82 by prohibiting refractive index change in the photonic crystals 86 and 89 while suppressing the transmission of the TE mode polarization through the optical waveguide 84 by causing refractive index change in the photonic crystal 91 and further suppressing the transmission of the TM mode polarization through the optical waveguide 83 by causing refractive index change in the photonic crystal 97. With this, the TM mode polarization is guided through the optical waveguide 84 while the TE mode polarization is guided through the optical waveguide 83, and thus, the TM mode polarization wave and the TE mode polarization wave are separated from each other. Thereby, polarization dependence is resolved in the light control element 81 and it becomes to realize a minute on-board optical interconnection switch by using the light control element 81.

Figure 9:
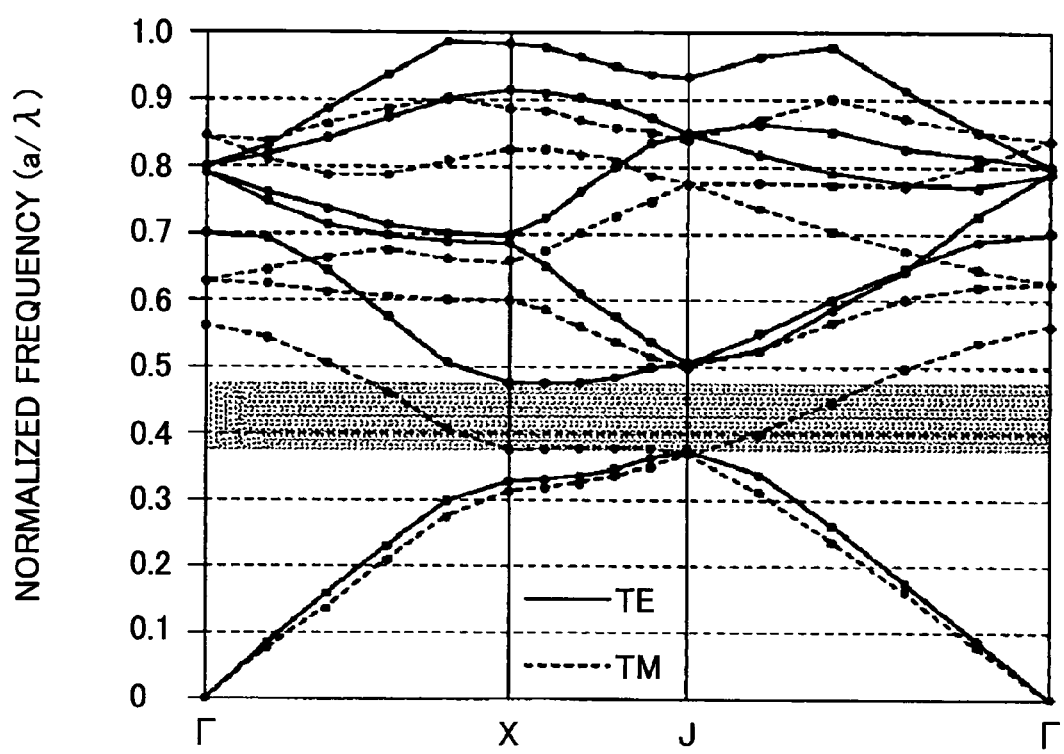
FIG. 9 is a photonic band diagram for a TE polarization light and a TM polarization light.

FIG. 9 shows the photonic band structure of a photonic crystal for a TE mode polarization light and a TM mode polarization light, wherein the calculation of FIG. 9 is made for the photonic crystal formed on a substrate having a refractive index of 2.2 in the form of a triangular lattice of circular holes having a diameter r and disposed with a pitch a filled with the air. In the example of FIG. 9, the calculation is made by the plane wave expansion method similarly to the case of FIG. 2 by assuming the relationship r=0.8 a between the diameter r and the pitch a.

Referring to FIG. 9, it can be seen that a photonic bandgap is formed for an arbitrary wave vector of the TE mode polarization light, while a photonic bandgap appears in a limited wave vector range for the case of the TM mode polarization light. In the case a light having a normalized frequency of 0.4 is supplied to the photonic crystal of FIG. 9, the TM mode polarization light passes through the photonic crystal, while the TE mode polarization light is reflected. By using this phenomenon, it becomes possible to construct a polarization separator as explained with reference to FIG. 8.

In the present embodiment, too, the light control element 81 can change the transmittance thereof by changing the refractive indices of the photonic crystals 87 and 90 simultaneously or by changing the refractive indices of the photonic crystals 88 and 91 simultaneously.

Seventh Embodiment

Figure 10:
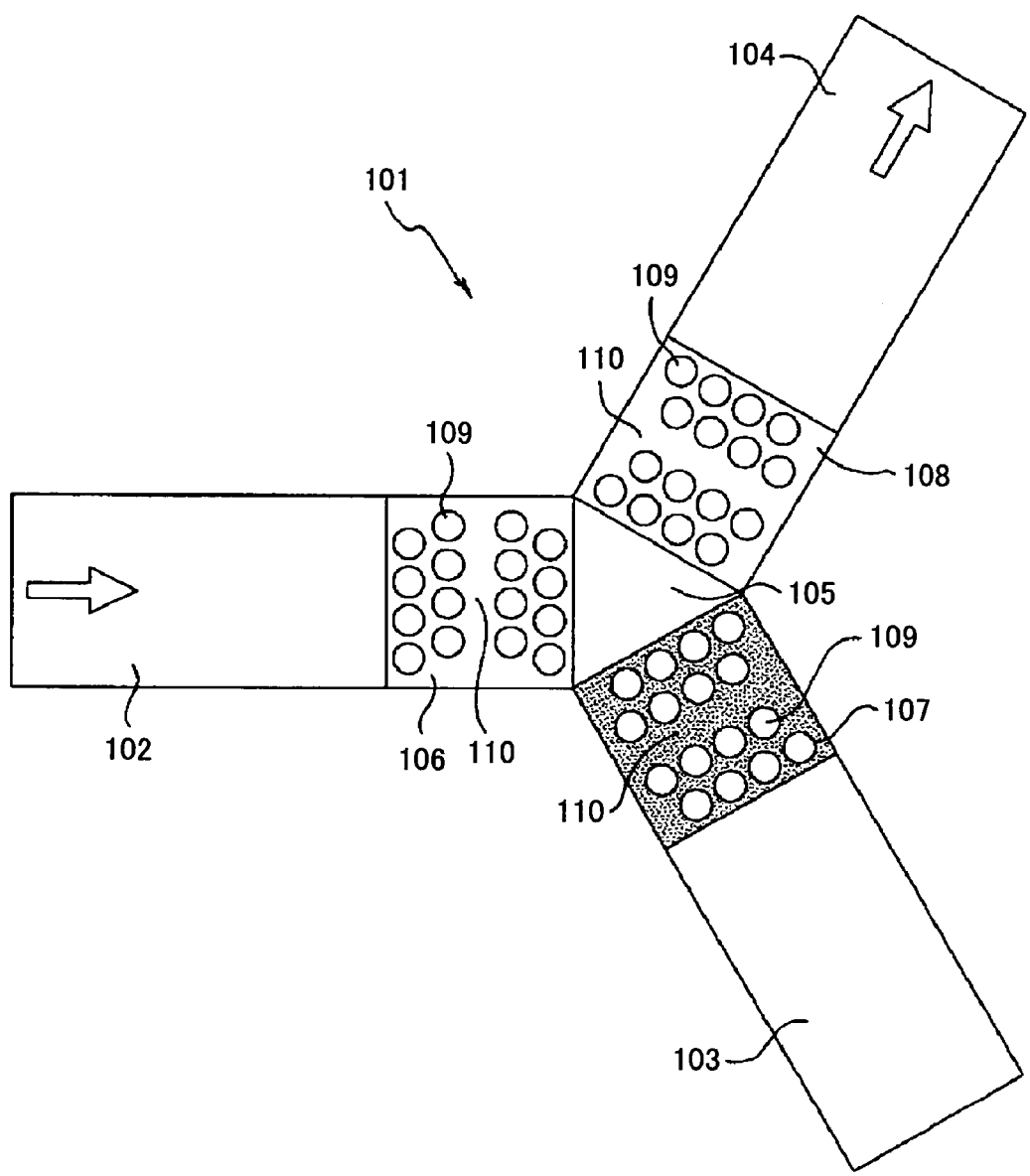
FIG. 10 is a plan view diagram showing the construction of a light control element according to a seventh embodiment of the present invention.

FIGS. 10 through twelve describe a light control element 101 according to a seventh embodiment of the present invention, wherein FIG. 101 shows the construction of the light control element 101 in a plan view.

Referring to FIG. 101, the light control element 101 of the present embodiment is constructed on a substrate not illustrated and includes three optical waveguides 102–104 formed on the substrate with a mutual angle of 120 degrees. At the central part of the optical waveguides 102–104, there is provided an optical deflection part 105 in the form of equilateral triangle as an optical coupling component, and respective ends of the optical waveguides 102–104 are connected to the optical deflection part 105. Further, foregoing ends of the optical waveguides 102–104 carry thereon respective photonic crystals 106–108 with a width of the optical waveguide as a variable refractive index part, such that the each of the photonic crystals can change the refractive index independently.

Figure 11A:
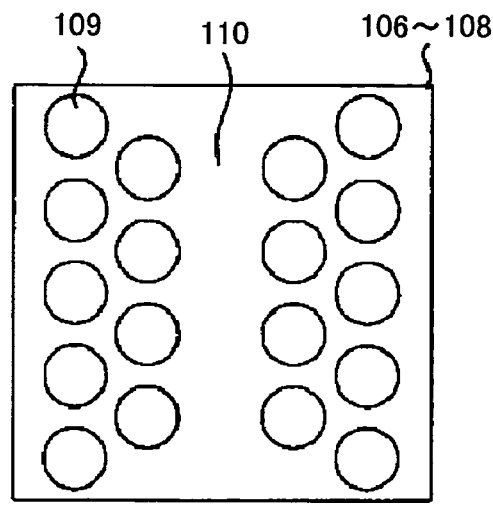
FIGS. 11A–11C are plan view diagrams showing example of defects in the photonic crystal.

Here, it should be noted that each of the photonic crystals 106–108 has a construction such as the one represented in FIG. 11A, wherein the photonic crystal is formed by a triangular array of optical atoms 109 forming the triangular lattice. Further, it should be noted that the photonic crystal includes a defect region 110 where formation of the optical atoms is suppressed, wherein the photonic crystal thus including the defect region 110 form an optical resonator structure.

In such an optical resonator formed by the photonic crystal, the number of the layers of the optical atoms at both sides of the defect region 110 depends on the desired reflectance. Further, the defect region 110 may be formed by point defects. Thereby, the number of the defects may be chosen according to the desired characteristics of the reflector. As a result of formation of such a defect region 110, the photonic crystal allows passage of a light falling in the photonic bandgap therethrough, provided that the light has a specific wave vector.

According to the construction of the present embodiment that uses a resonance mode, not the change of the photonic bandgap caused by the refractive index change, it becomes possible to achieve the desired optical switching with a minute change of the band structure. When the wavelength is chosen properly, it becomes possible, with the light control element of the present embodiment, to achieve the desired reflectance control even in the case an electro-optic material characterized by a refractive index change of 0.01 or less is used.

Figure 12:
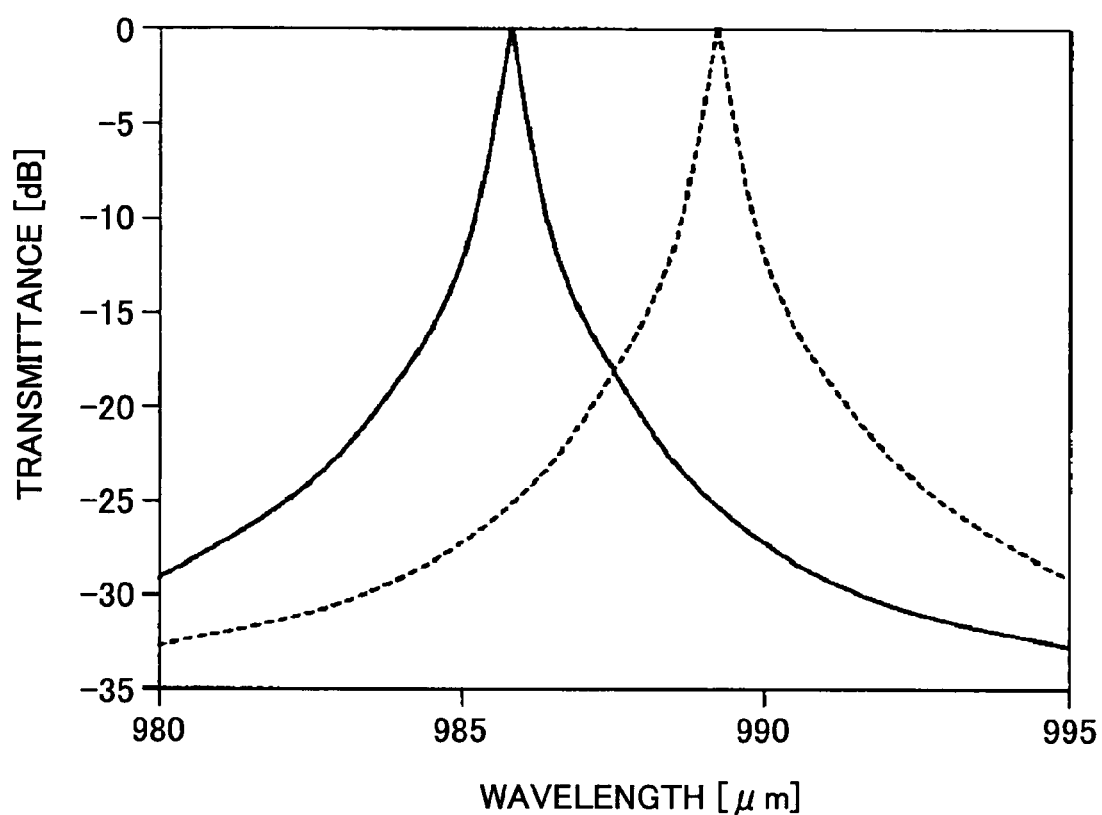
FIG. 12 is a characteristic diagram showing the result of simulation showing the change of transmittance in the case optical atoms of one row are deficient.

FIG. 12 shows the wavelength dependence of the transmittance for a photonic crystal in which the optical atoms for one row are missing in correspondence to the defect region 110. In the calculation, a pitch a of 400 nm is assumed and a radius r of 320 nm is assumed (r=0.80 a). Further, it is assumed that the substrate has a refractive index of 2.2 and the circular hole has a refractive index of 1.0.

The simulation was conducted by the FDTD method-for the case a pulse having a wavelength of 850 nm is injected in the Γ-X direction of the photonic crystal, together with the result for the case in which the refractive index is changed by 1%.

From FIG. 12, it can be seen that a wavelength change of about 5 nm takes place with the refractive index change of 1%. Further, the extinction ratio changes with the number of the layers of the optical atoms in the photonic crystal and an extinction ratio of 25 dB or more can be secured when there are formed optical atoms in six layers. This means that it becomes possible to control the transmission and reflection of light by using the thickness of 2 μm for the photonic crystal. By increasing the number of the layers, the extinction ratio can be increased further.

For the material that causes such a refractive index change, it is possible to use an electro-optic material such as lithium niobate, PLZT, ceramics, organic materials, and the like. Further, 1% of refractive index change can be induced by using a carrier plasma effect in a semiconductor quantum well structure. By forming such a defect region in multiple and with uniformity, it becomes possible to control the transmission profile of the light.

In any of these, it is possible to flatten the resonant peak by forming plural photonic crystal resonators in a photonic crystal while controlling the gap between these resonator parts.

In more detail, it is possible to construct a lithium niobate defect structure to have a multiple non-uniform line defect structure, in which there are provided three line defects in a substrate of lithium niobate forming the photonic crystal in such a manner that the line defect interval at the center is set to 0.5–0.8 times of the line defect interval for other line defects. By doing so, it becomes possible to attain the transmittance of 98% or more in the case of the multiple non-uniform defect structure when there is caused a wavelength shift of 0.5 nm from the wavelength of the maximum transmittance. In the case of the structure containing only one line defect, it should be noted that the transmittance value decreases to 50% or less when the wavelength has shifted by 0.5 nm from the maximum transmission wavelength.

Figure 11B:
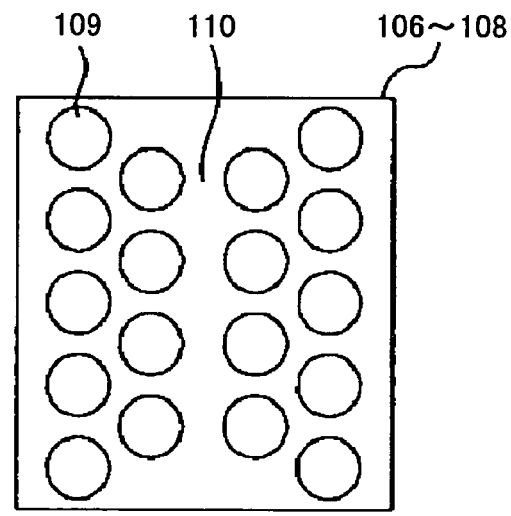
Figure 11C:
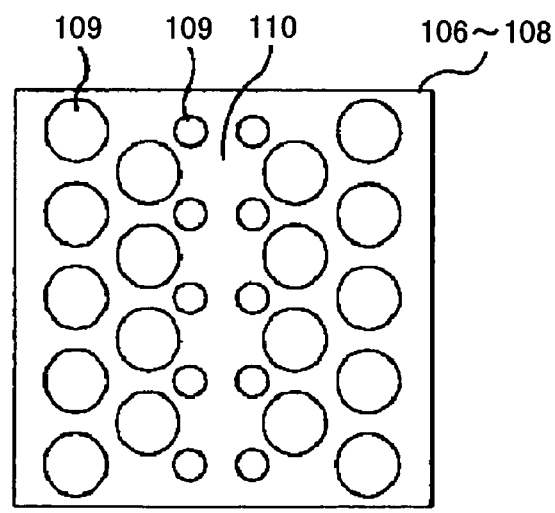

Here, it should be noted that the line defect region 110 can be formed by changing the interval of the adjacent optical atoms 109 in the photonic structure as shown in FIG. 11B. Alternatively, the line defect region 110 can be formed by changing the size of the optical atoms 109 adjacent to the line defect region 110.

According to the present embodiment, it becomes possible to suppress the degradation of optical switching characteristics, in an optical switch or optical modulator that uses a resonator formed in a photonic crystal, caused by sharp change of reflectance at the resonator part by minute fluctuation of wavelength of the light such as the fluctuation of laser oscillation wavelength of the laser diode used for the light source, and it becomes possible to construct an optical switch or optical modulator tolerant to fluctuation or variation of the wavelength of the light.

Eighth Embodiment

Next, a light control element 111 according to an eighth embodiment of the present invention will be described with reference to FIG. 13.

Figure 13:
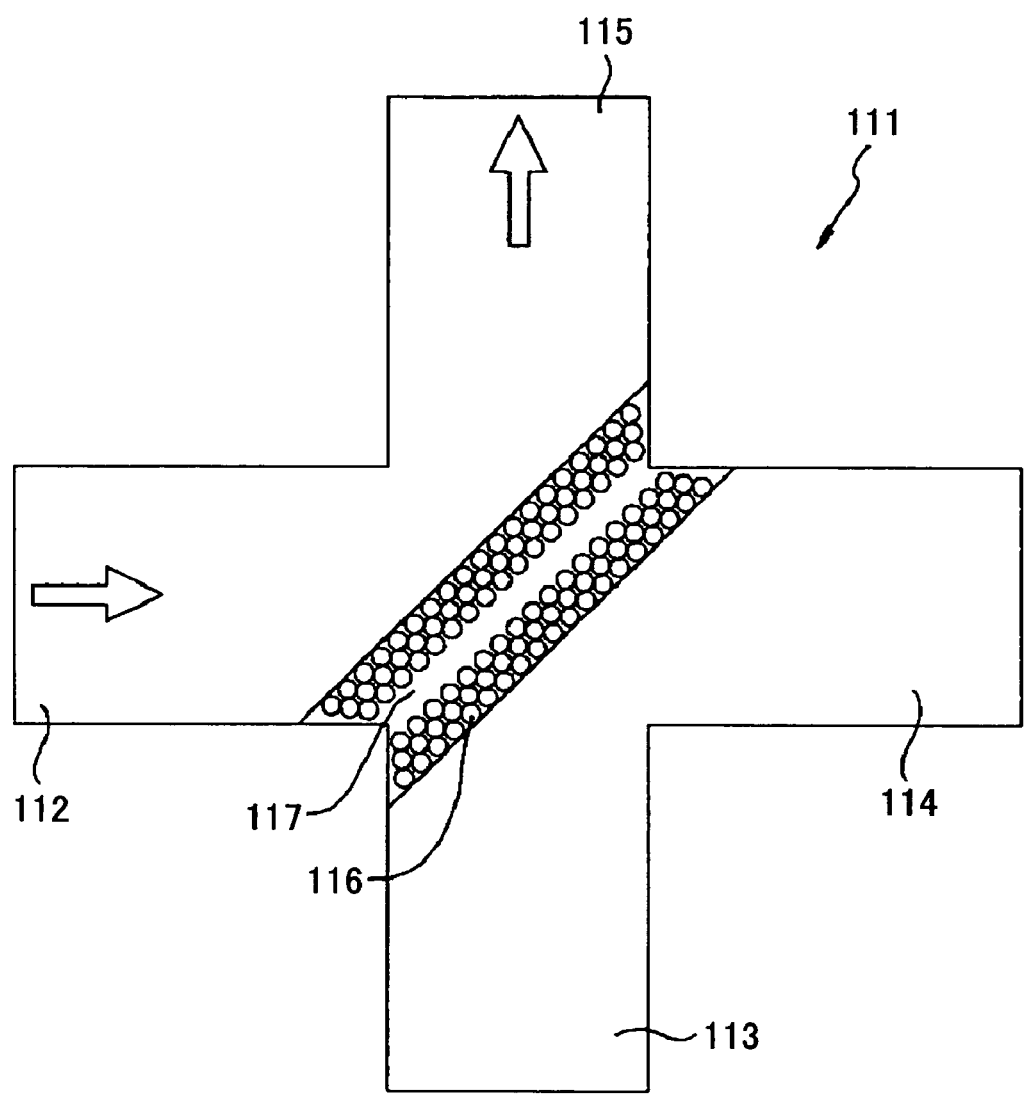
FIG. 13 is a plan view diagram showing the construction of a light control element according to an eighth embodiment of the present invention.

Referring to FIG. 13, the light control element 111 is constructed on a substrate not shown and includes optical waveguides 112–115 forming a cross pattern on the substrate, wherein there is provided a photonic crystal structure 116 in the intersection part of the optical waveguides 112–115 as an optical coupling component. Thereby, it should be noted that the photonic crystal structure 116 is formed in the optical coupling component along one of the two diagonal lines thereof.

In the illustrated example, it can be seen that the photonic crystal structure 116 includes therein a defect region 117 corresponding to two or more columns of optical atoms forming the photonic crystal structure 116. In the illustrated example, the optical atoms constituting the photonic crystal structure 116 are arranged symmetric with respect to the foregoing defect region 117, and thus, there are formed at least two layers of the optical atoms in the photonic crystal 116 at both sides of the defect region 117 with the same number of layers for the optical atoms. The structure of FIG. 13 can be connected to a two-dimensional multimode optical waveguide.

Here, "column" means the array of optical atoms in the photonic crystal 116 aligned in the direction of the incident light coming in perpendicularly to the incident surface of the photonic crystal structure 116. On the other hand, "layer" is defined as representing the array of optical atoms aligned parallel to the incident surface of the photonic crystal structure 116 and stacked in the traveling direction of the incident light.

Thus, in the example of FIG. 13, in which the optical atoms forming the photonic crystal 116 are aligned with the angle of 45 degrees with respect to the incident light, the photonic crystal 116 includes seven layers of the optical atoms wherein optical atoms are absent in the fourth layer in correspondence to the defect region 117. Further, it should be noted that the first layer includes 19 optical atoms aligned parallel to the incident surface.

Further, the photonic crystal structure 116 is disposed to form an angle with respect to the optical waveguides 112–115 as noted before.

In such a structure, an optical signal incident from the optical waveguide 112 with the wavelength corresponding to the resonant mode of the resonator formed by the defect region 117 passes through the photonic crystal structure 116 to the exit side optical waveguide 114 in the state there is caused no refractive index change in the photonic crystal structure 116.

When the refractive index of the photonic crystal structure 116 is changed in this state on the other hand, the resonant wavelength of the resonator is changed and the incident optical signal is reflected by the photonic crystal structure 116 toward the optical waveguide 115.

In the present embodiment, the photonic crystal structure 116 is required to include at least two layers of optical atoms at both sides of the defect region 117 for achieving the foregoing operation, wherein an efficient optical path switching becomes possible, in the case the defect region 117 is formed obliquely, when the optical atoms in the photonic crystal structure 116 are arranged such that there exists the same number of optical atoms, and hence the same number of layers, at both sides of the defect region 117 as measured in the direction perpendicularly to the defect region 117.

When the number of the layers of optical atoms in the photonic crystal structure 116 is excessive, the photonic crystal, acting as a mirror, reflects the incident light and the incoming optical signal cannot reach the defect region 117 forming the resonator. Thereby, the optical path switching caused by the defect region 117 is not achieved. According to the simulation conducted by the inventor of the present invention, it was confirmed that the effect of the defect region 117 appears clearly when the defect region 117 is sandwiched by the photonic crystals each including six layers of optical atoms. Further, it was observed also that the characteristic of the resonator changes significantly when the number of the optical atom layer is increased or decreased by only one.

In view of the foregoing, it is preferable to set the number of layers of the optical atoms in the photonic crystal structure 116 such that number does not exceed ten at both sides of the defect structure 117.

Further, in the present embodiment, there exist wave vector components in the photonic crystal structure 116 corresponding to the wave propagating through the photonic crystal structure 116 and incident to the defect region 117 in the direction other than the direction perpendicular to the elongating direction of the defect region 117. Thus, control of transmittance is possible in the present embodiment also in the case a light is incident to the defect region 117 forming a two-dimensional plane in the photonic crystal structure 116, with such an angle that the incident light has a wave vector inclined to the defect region 117.

Thus, the light control element 111 of the present embodiment is not only applicable to the case in which a plane wave having a single wave vector comes in but also to the case an incident light having a distribution of wave vectors such as an optical beam comes in. Further, the present invention can not only control the transmission and reflection of a light but can also switch the traveling path of the light coming in obliquely from an incident side optical waveguide to an exit side optical waveguide.

As a modification, it is possible in the present embodiment to provide a variable reflector on the optical waveguide 115 by a photonic crystal similarly to the case of FIG. 6 for suppressing leakage of light to the optical waveguide 115 when the incident light travels from the optical waveguide 112 to the optical waveguide 114.

It should be noted further that the optical waveguides 112–115 of FIG. 13 may form an angle other than 90 degrees and an angle exceeding 90 degrees may also be used. Further, because the light control element 111 selectively passes a light of a specific wavelength, the light control element 111 can be used also as a wavelength filter.

Ninth Embodiment

Figure 14:
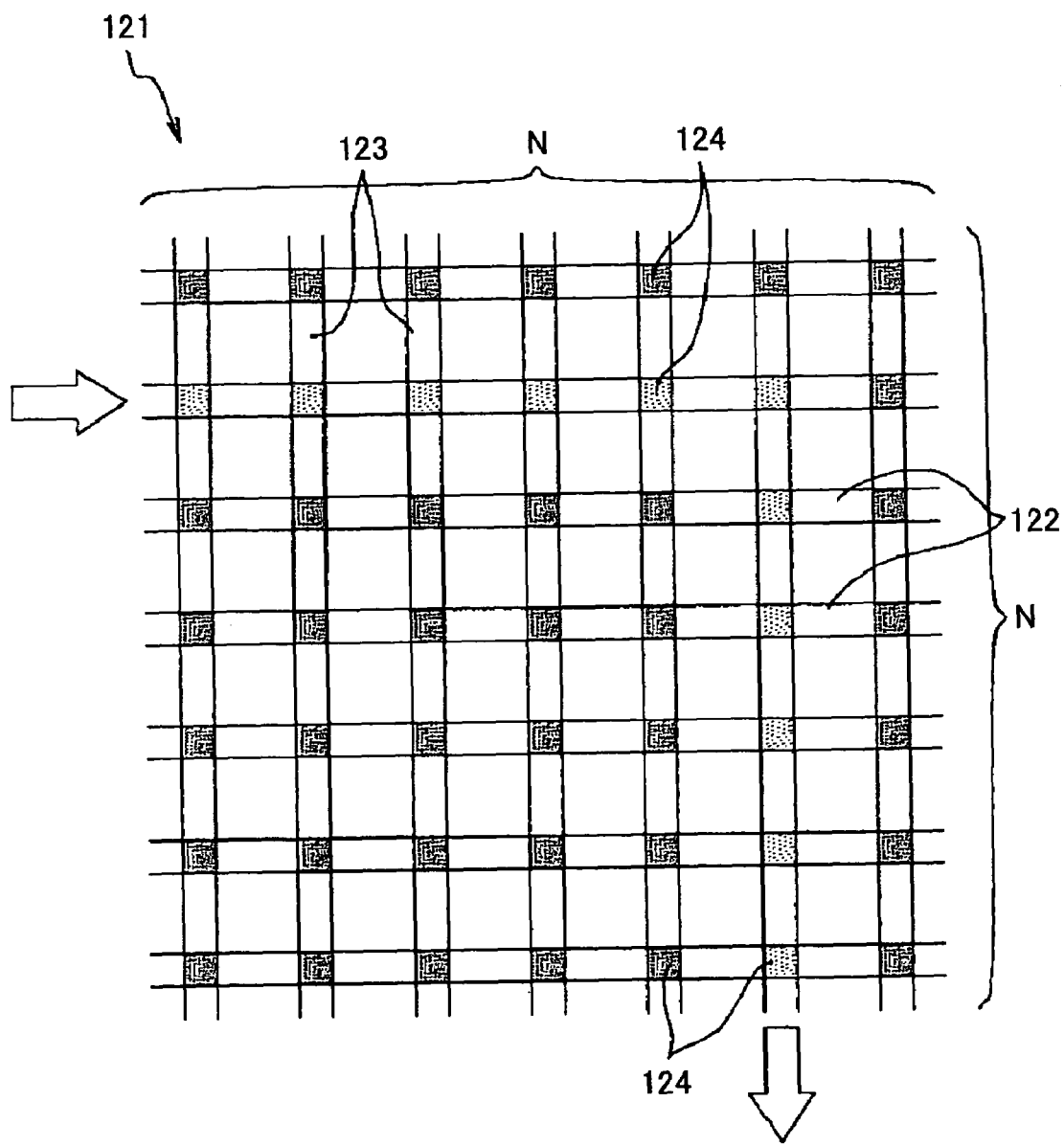
FIG. 14 is a plan view diagram showing the construction of a light control device according to a ninth embodiment of the present invention.

Next, an optical control device 121 according to a ninth embodiment of the present invention will be described with reference to FIG. 14 showing the optical control device 121 in a plan view.

Referring to FIG. 14, the optical control device 121 of the present embodiment is constructed on a substrate not illustrated and includes N×N optical waveguides 122 and 123 formed on the substrate in the form of a two-dimensional array and $N^2$ optical coupling components formed at each intersection part of the optical waveguides 122 and 123 in connection therewith, wherein the optical waveguides 122 and 123 form, together with the optical coupling components 124, an N×N optical matrix switch. Thereby, each of the optical coupling components 124 is provided to include the variable refractive index part by forming a photonic crystal structure, as in the case of the light control elements 1, 11, 21, 41, 61, 81, 101, and the like, explained before.

Thus, by changing the refractive index of the optical coupling components 124 suitably, the traveling direction of the light is switched and the N×N matrix switch of FIG. 14 can direct the incident light to a desired optical waveguide. In the illustrated example, the refractive index of the optical coupling components 124 is changed such that an incident light pass represented by an arrow passes through the optical components represented by a thin hatching and exit as represented by another arrow.

According to the present embodiment, it is possible to form the foregoing N×N matrix switch in an extremely minute region. For example, in the case optical waveguides having a width of 10 μm are disposed with a pitch of 40 μm, it becomes possible to form a 20×20 matrix switch in a region of 1 mm×1 mm. In the case a structure causing the refractive index change by electric power is used, there is a need of providing electrodes. Still, it is possible to construct the optical switch with the size of 5 mm×5 mm. It should be noted that the optical switch of this size can be mounted on a substrate of an electronic circuit and can be used as an on-board optical interconnection switch.

Tenth Embodiment

Figure 15:
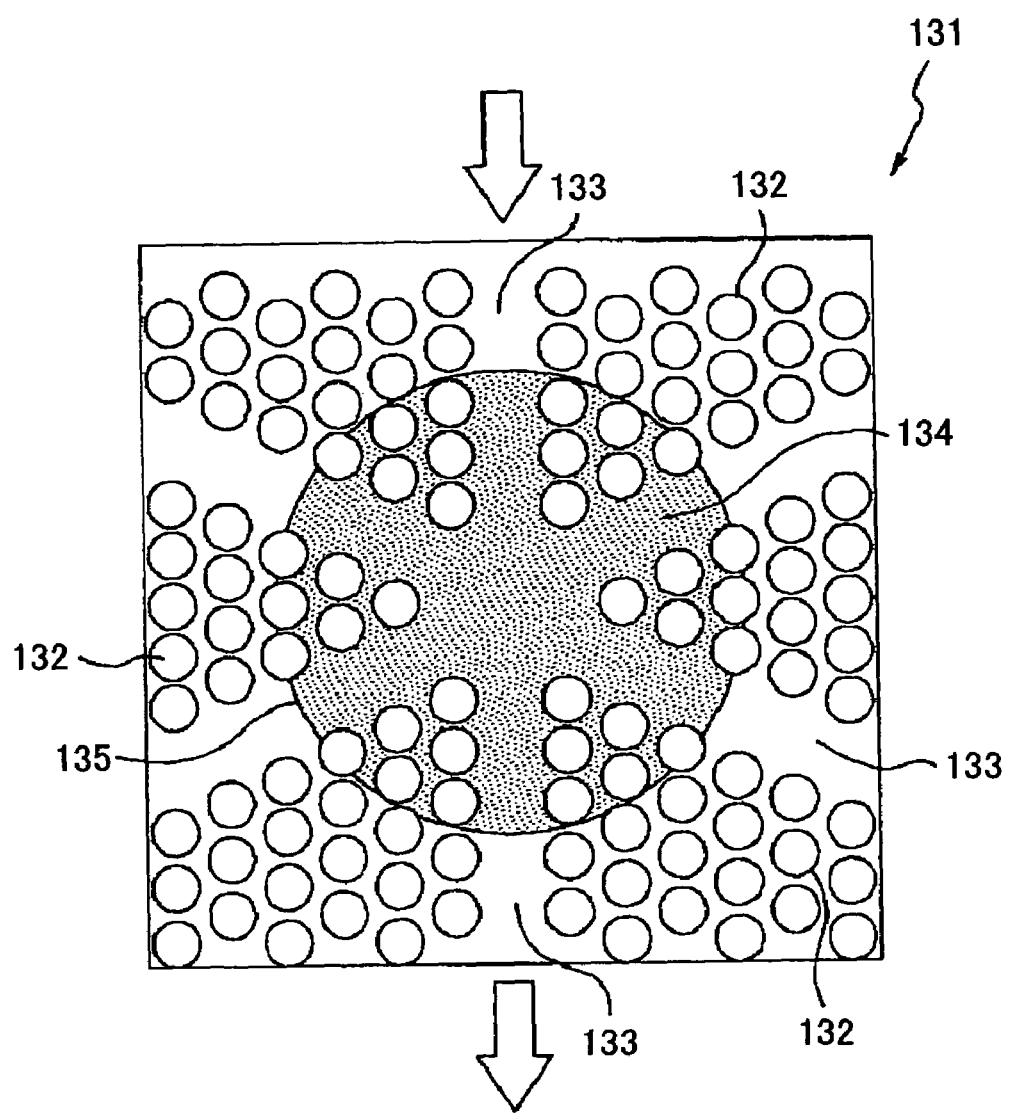
FIG. 15 is a plan view diagram showing the construction of a light control element according to a tenth embodiment of the present invention.

Next, a light control element 131 according to a tenth embodiment of the present invention will be described with reference to FIG. 15, wherein FIG. 15 shows the light control element 131 in a plan view.

Referring to FIG. 15, the light control element 131 is formed on a substrate not illustrated and includes a photonic crystal 132 formed on the substrate.

In the photonic crystal 132, there are formed plural optical waveguides 133 formed by a line photonic crystal defect, such that the optical waveguides 133 cross with each other. In such a structure in which plural optical waveguides 133 of photonic crystal line defect cross with each other, there is caused an optical resonance state in the part 134 where the optical waveguides 133 cross with each other. It should be noted that this is a phenomenon pertinent to photonic crystal. Because such a structure can achieve an extremely large Q value, there is a possibility that the intersection part is used for capturing photons.

It should be noted that the foregoing optical resonance state can be controlled by changing the refractive index for the part 135 including the intersection part as a variable refractive index part, and thus, it becomes possible to construct an optical switch, an optical signal delay line, an optical filter, and the like, that operates on the principle of capturing and release of photons. Because this change of the resonant state is extremely sensitive, it is possible to cause the change of the state with a minute change of the refractive index.

Eleventh Embodiment

Figure 16:
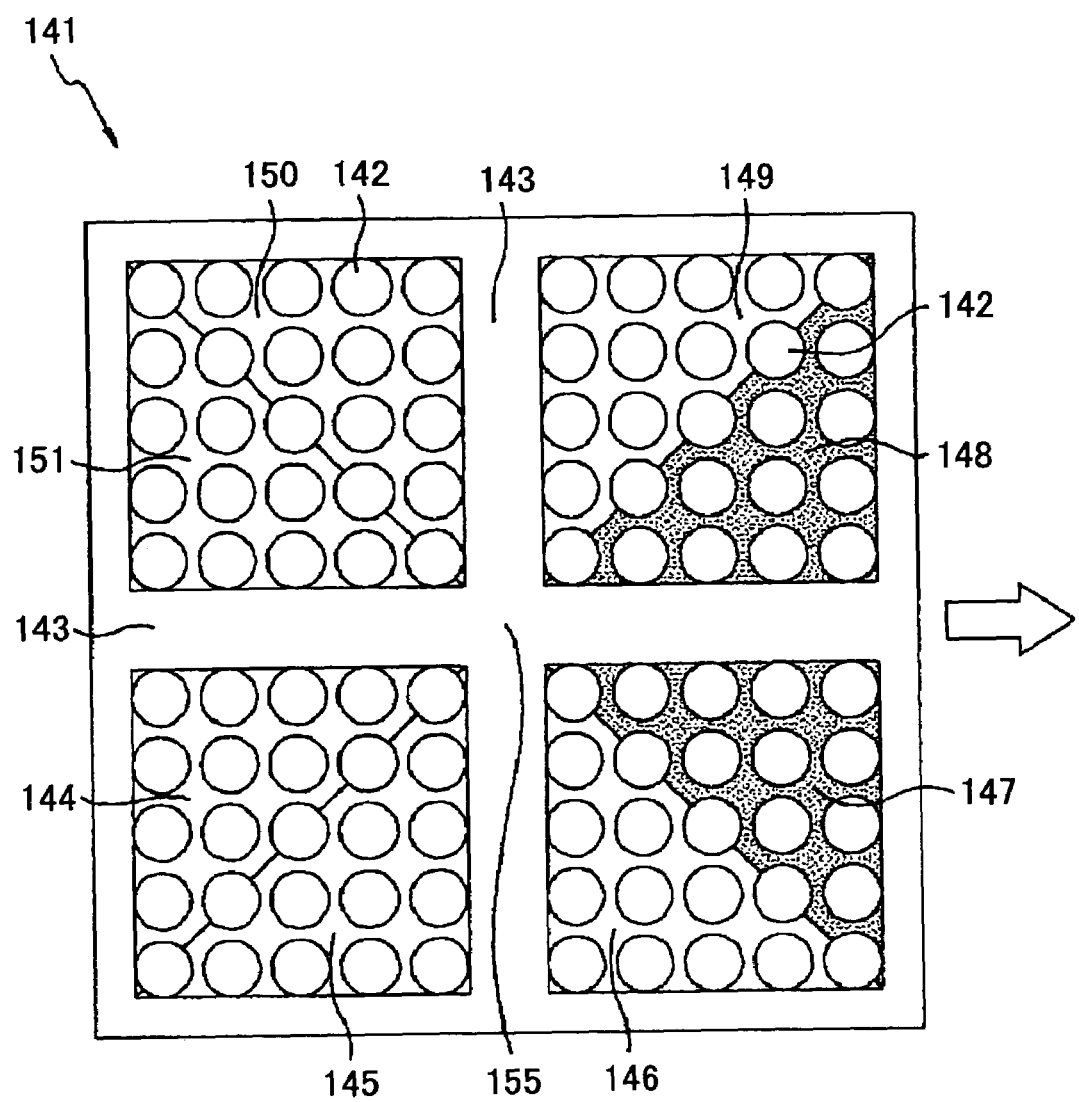
FIG. 16 is a plan view diagram showing the construction of a light control element according to an eleventh embodiment of the present invention.

Next, a light control element 141 according to an eleventh embodiment of the present invention will be described with reference to FIG. 16, wherein FIG. 16 shows the optical control element 141 in a plan view.

Referring to FIG. 16, the light control element 141 is constructed on a substrate not shown and includes a photonic crystal structure 142 formed on the substrate not shown, wherein there re formed a cross pattern of optical waveguides 143 by a photonic crystal line defect crossing with each other. Further, each of the four regions of the photonic crystal structure 142 separated from each other by the optical waveguides 143 is divided into two regions by a diagonal line, and thus, there are formed in all eight variable refractive index parts 144–151 that can change the refractive indices thereof independently.

The light control element 141 of the present invention utilizes the resonance formed in the region 155 where the optical waveguides 143 of photonic crystal line defect cross with each other. Thus, by changing the refractive index of the variable refractive index parts 144–151 independently, it becomes possible to control the optical switching direction. With this, it becomes possible to construct an optical switch, optical signal delay line, optical filter, and the like, that operates based on the principle of capturing and release of photons.

Twelfth Embodiment

Figure 17:
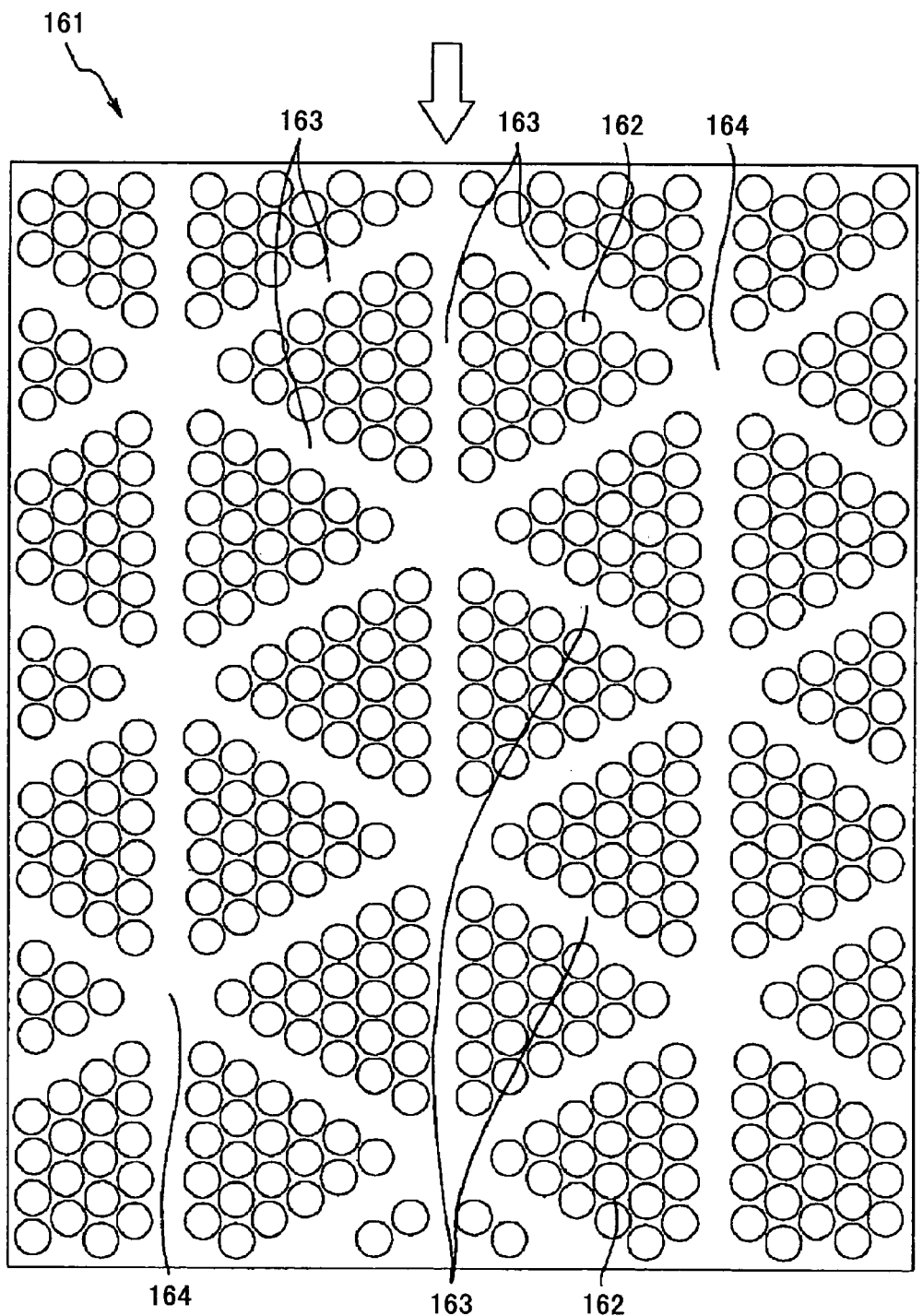
FIG. 17 is a plan view diagram showing the construction of a light control device according to a twelfth embodiment of the present invention.
Figure 18:
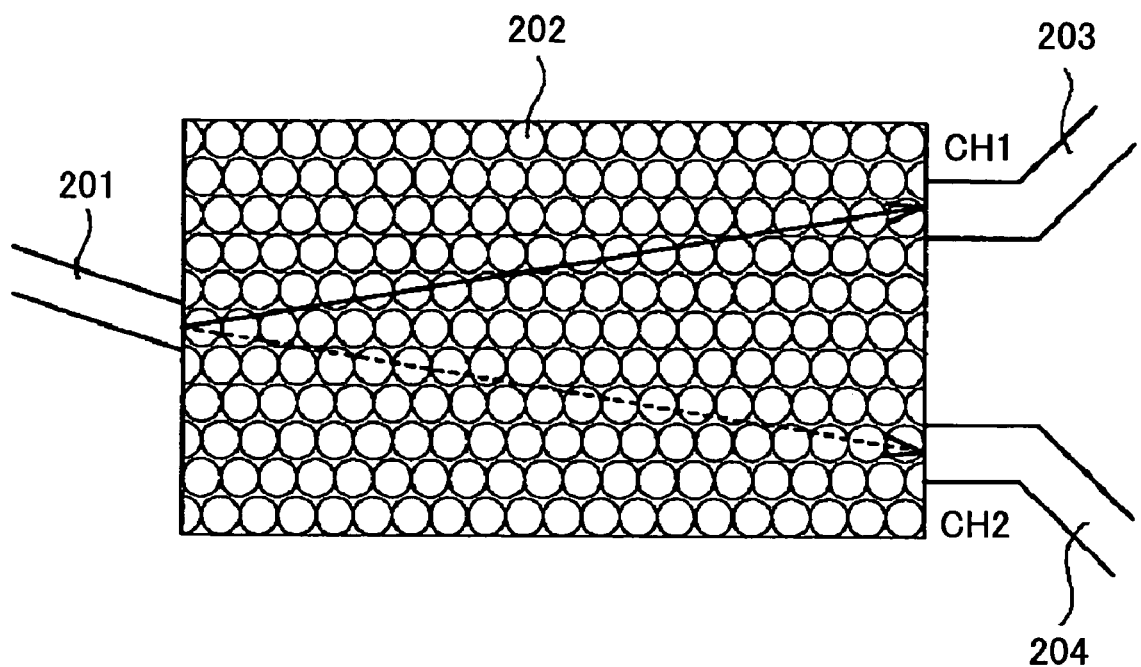
FIG. 18 is a plan view diagram showing a conventional example.

Next, a light control device 161 according to a twelfth embodiment of the present invention will be explained with reference to FIG. 17, wherein FIG. 17 shows the construction of the light control device 161 in a plane view.

Referring to FIG. 17, the light control device 161 of the present embodiment is constructed on a substrate not illustrated wherein there is formed a photonic crystal structure 162 on the entire surface of the substrate. Further, N×N×N optical waveguides 163 are formed in the photonic crystal structure 162 two-dimensionally in the form of photonic crystal line defect such that the optical waveguides 163 extends in the vertical direction, in the direction from upper right to lower left and further in the direction from upper left to lower right, in the plane of the sheet of FIG. 17. Further, at each intersection of these optical waveguides 163 of photonic crystal line defects, there is formed an optical coupling part including a variable refractive index part similarly to the light control element 131 or 141.

As noted before, there is formed a variable refractive index part at each of the intersections (optical coupling part 164) of these optical waveguides 163 forming a photonic crystal line defect, and thus, by changing the refractive index of these optical coupling parts 164 independently, the resonant state formed therein is changed and the light control device 161 operates as an optical matrix switch. In such an optical matrix switch, it is possible to switch the incident light to a desired optical waveguide.

Thus, by combining two or more of the embodiments explained heretofore, various optical devices such as an optical matrix switch, an optical device array or an optical delay line array can be constructed.

Thus, in such a construction, it is possible to capture the photons in an optical signal traveling straight through any of such intersections in the intersection by causing a refractive index change therein. Further, by providing such a change of refractive index to only a part of the intersection part, the traveling path of the optical signal is changed with respect to the original path. By utilizing such a phenomenon, it becomes possible to switch the incident light to any of the optical waveguides 163 formed in the photonic crystal structure 162 in the form of line defect of photonic crystal.

Further, the present invention is not limited to those embodiments described heretofore, but various variations and modifications may be made without departing from the scope of the invention.

The present invention is based on Japanese priority application 2003-113591 filed on Apr. 18, 2003, the entire contents of which are incorporated herein as reference.

What is claimed is:

1. A light control element comprising:
   a substrate;
   an optical waveguide formed on said substrate;
   an optical coupling component provided on said substrate by a photonic crystal structure, said optical waveguides being connected to said optical coupling component; and
   a variable refractive index part provided in a part of said photonic crystal structure, said variable refractive index part dividing said optical coupling component into at least two regions,
   wherein an interface between said regions changes a traveling direction of a light incident thereto by causing reflection in at least one wavenumber of said light in response to a change of refractive index in said variable refractive index part.

2. A light control element as claimed in claim 1, wherein said photonic crystal includes a defect region.

3. A light control element as claimed in claim 2, wherein said photonic crystal includes at least two layers of photonic crystal arrays at both sides of said defect region, a refractive index being changed for said defect region.

4. A light control element as claimed in claim 2, wherein said photonic crystal includes at least two layers of photonic crystal arrays at both sides of said defect region, a refractive index being changed for the entirety of said photonic crystal.

5. A light control element as claimed in claim 2, wherein said photonic crystal includes at least two layers of photonic crystal arrays at both sides of said defect region, each of said photonic crystal arrays including the same number of layers.

6. A light control element as claimed in claim 5, wherein the number of layers of the photonic crystal array is ten or less.

7. A light control element as claimed in claim 2, wherein said photonic crystal has a structure having a wave vector component of a light incident to said defect region through said photonic crystal in a direction other than the direction perpendicular to the elongating direction of the defect region.

8. A light control element as claimed in claim 2, wherein the photonic crystal includes plural defect regions of different sizes.

9. A light control element comprising:
   a substrate;
   a plurality of optical waveguides formed on said substrate;
   an optical coupling component formed of a photonic crystal and provided on said substrate in a polygonal form, at least four of said optical waveguides being coupled to said optical coupling component; and
   a plurality of variable refractive index parts formed in said polygonal optical coupling component, said plurality of variable refractive index parts being formed in one or more regions of said polygonal optical coupling component divided from each other by a diagonal line,
   said plurality of variable refractive index parts changing a refractive index thereof independently,
   said light control element deflecting a traveling direction of light in said optical waveguide in response to a change of refractive index of said variable refractive index part.

10. A light control element comprising:
    a substrate;
    a plurality of optical waveguides formed on said substrates;
    an optical coupling component formed of a photonic crystal and provided on said substrate in a polygonal form, at least four of said optical waveguides being connected to said optical coupling component;
    a photonic crystal formed on said optical waveguides at an end part thereof connected to said optical coupling component; and
    a plurality of variable refractive index parts formed of said photonic crystal and provided on said optical waveguide in correspondence to regions of said polygonal optical coupling component divided from each other by a diagonal line,
    said variable refractive index parts changing a refractive index thereof independently,
    said light control element deflecting a traveling direction of light from said optical waveguide in response to a change of refractive index of said variable refractive index part.

11. A light control element comprising:
    a substrate;
    a plurality of optical waveguides formed on said substrate; and an optical coupling component formed of a photonic crystal and provided on said substrate in a polygonal form, at least four of said optical waveguides being coupled to said polygonal optical coupling component; and a plurality of variable refractive index parts formed in respective regions of said polygonal optical coupling components, said regions being divided from each other by a diagonal line of said polygonal optical coupling component, said variable refractive index parts changing a refractive index thereof independently, said light control element branching a light in said optical waveguide in response to a change of refractive indeed of said variable refractive index part.

12. A light control element comprising:

a substrate;

a plurality of optical waveguides formed on said substrate;

an optical coupling component formed on said substrate and coupled with at least three of said optical waveguides;

first and second photonic crystals formed on an optical waveguide coupled to said optical coupling component at an end part thereof coupled to said optical coupling component, said first photonic crystal including a structure for reflecting or transmitting a transverse electric mode wave, said second photonic crystal including a structure for reflecting or transmitting a transverse magnetic mode wave; and first and second variable refractive index parts provided respectively by said first and second photonic crystals, said first variable refractive index part and said second variable refractive index part respectively changing a transmittance of said transverse electric mode wave and a transmittance of said transverse magnetic mode wave independently from each other, said light control element separating a transverse electric mode wave and a transverse magnetic mode wave in response to a change of refractive index of said first and second variable refractive index parts.

13. A light control element, comprising:

a substrate;

a plurality of optical waveguides formed on said substrate;

an optical coupling component formed on said substrate, at least three of said optical waveguides being connected to said optical coupling element;

first and second photonic crystals formed on an optical waveguide coupled to said optical coupling component at an end part thereof coupled to said optical coupling component, said first and second photonic crystals respectively including a structure for reflecting or transmitting an transverse electric mode wave and a structure for reflecting or transmitting a transverse magnetic mode wave; and first and second variable refractive index parts formed respectively in said first and second photonic crystals, said first variable refractive index part and said second variable refractive index part changing a transmittance of said transverse electric mode wave and a transmittance of said transverse magnetic mode wave respectively by changing a refractive index of said first and second variable refractive index parts independently.

14. light control device, comprising:

a substrate;

N×N optical waveguides formed on said substrate so as to cross with each other at intersections distributed two-dimensionally on said substrate; and $N^2$ optical coupling components each provided to one of said intersections of said optical waveguides, a variable refractive index part provided to each of said optical coupling component, each of said variable refractive index part dividing said optical coupling component into at least two regions, wherein an interface between said regions changes a traveling direction of a light incident thereto by causing reflection in at least one wavenumber of said light in response to a change of refractive index in said variable refractive index part.

* * * * *